United States Patent Office 3,215,088
Patented Nov. 2, 1965

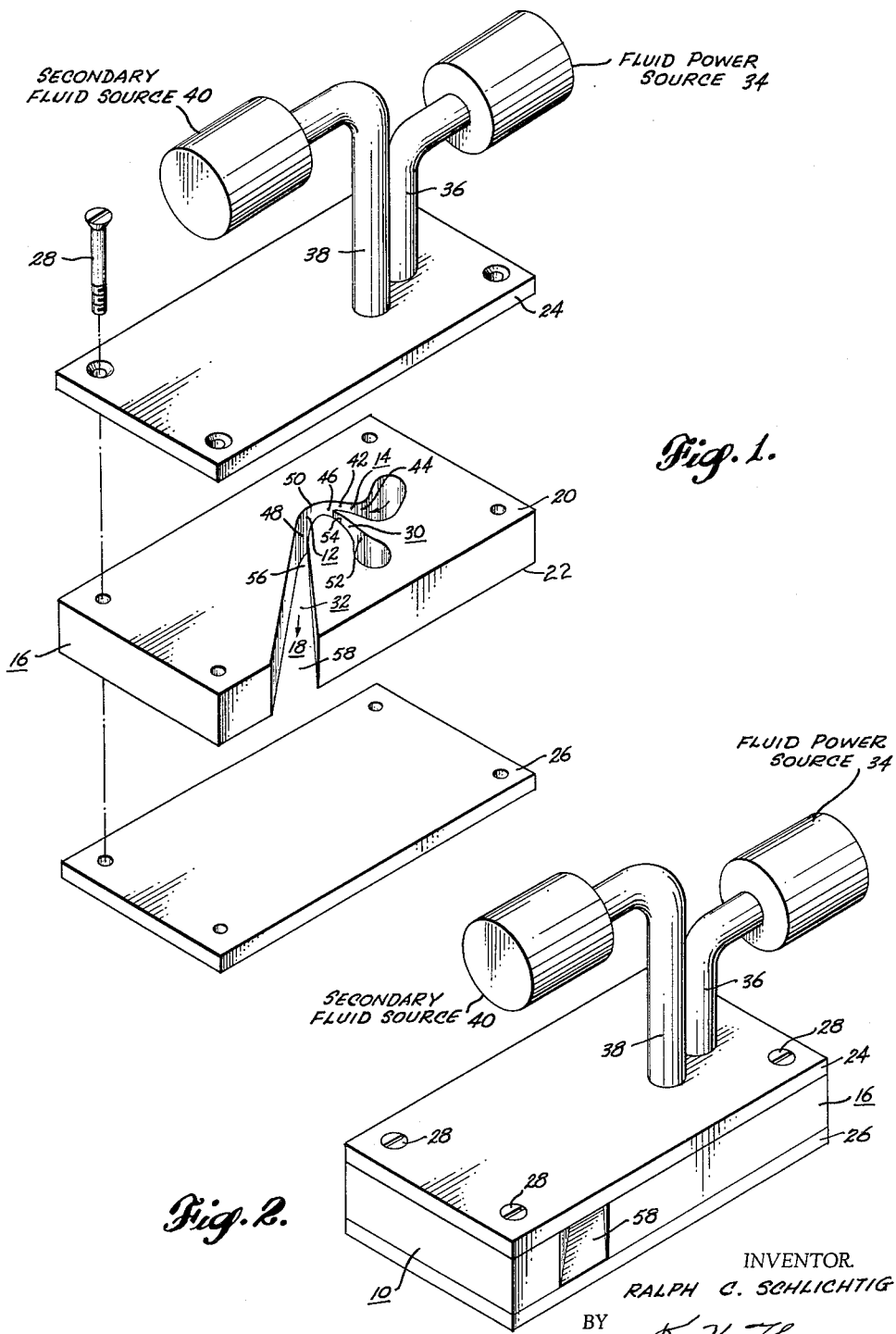

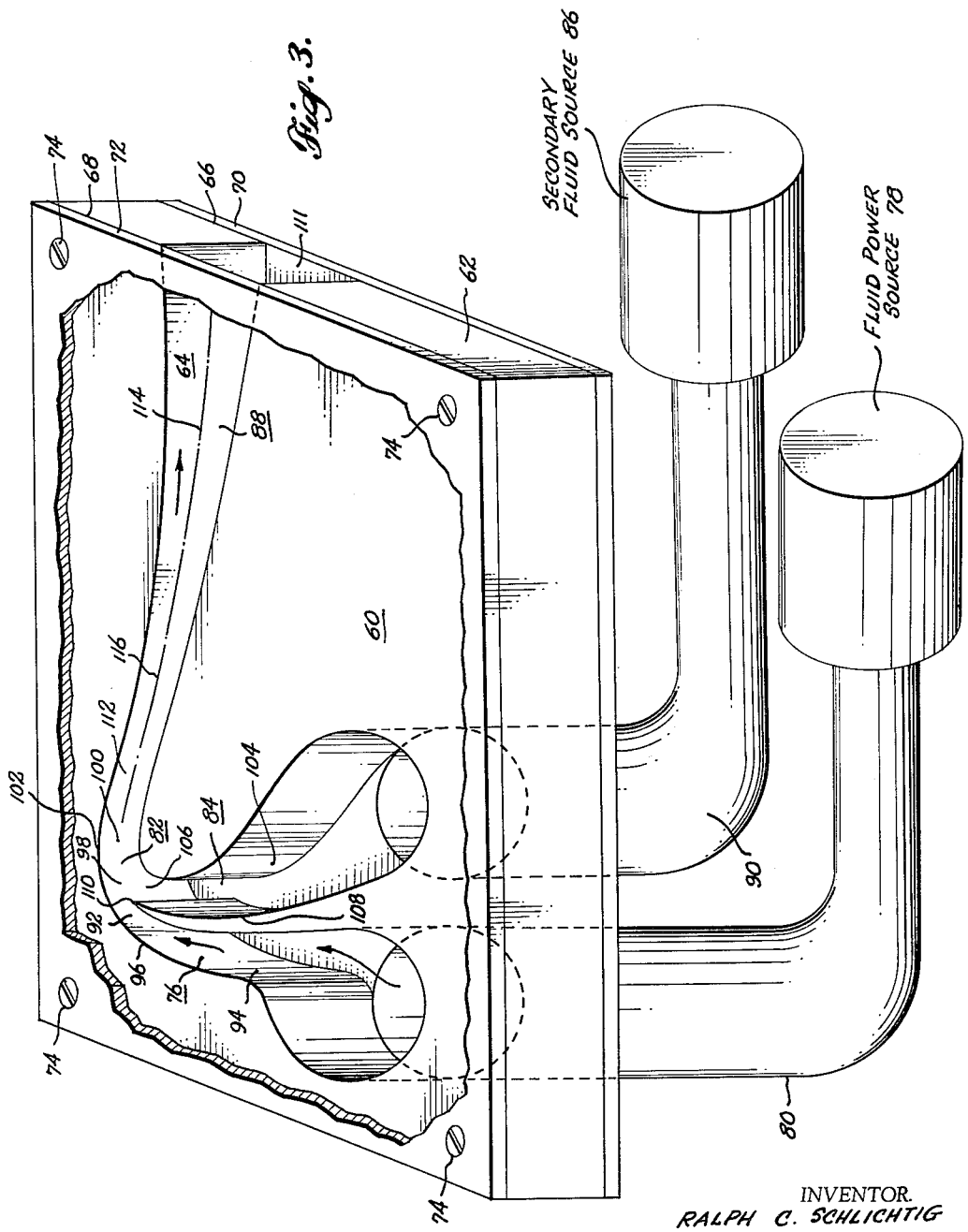

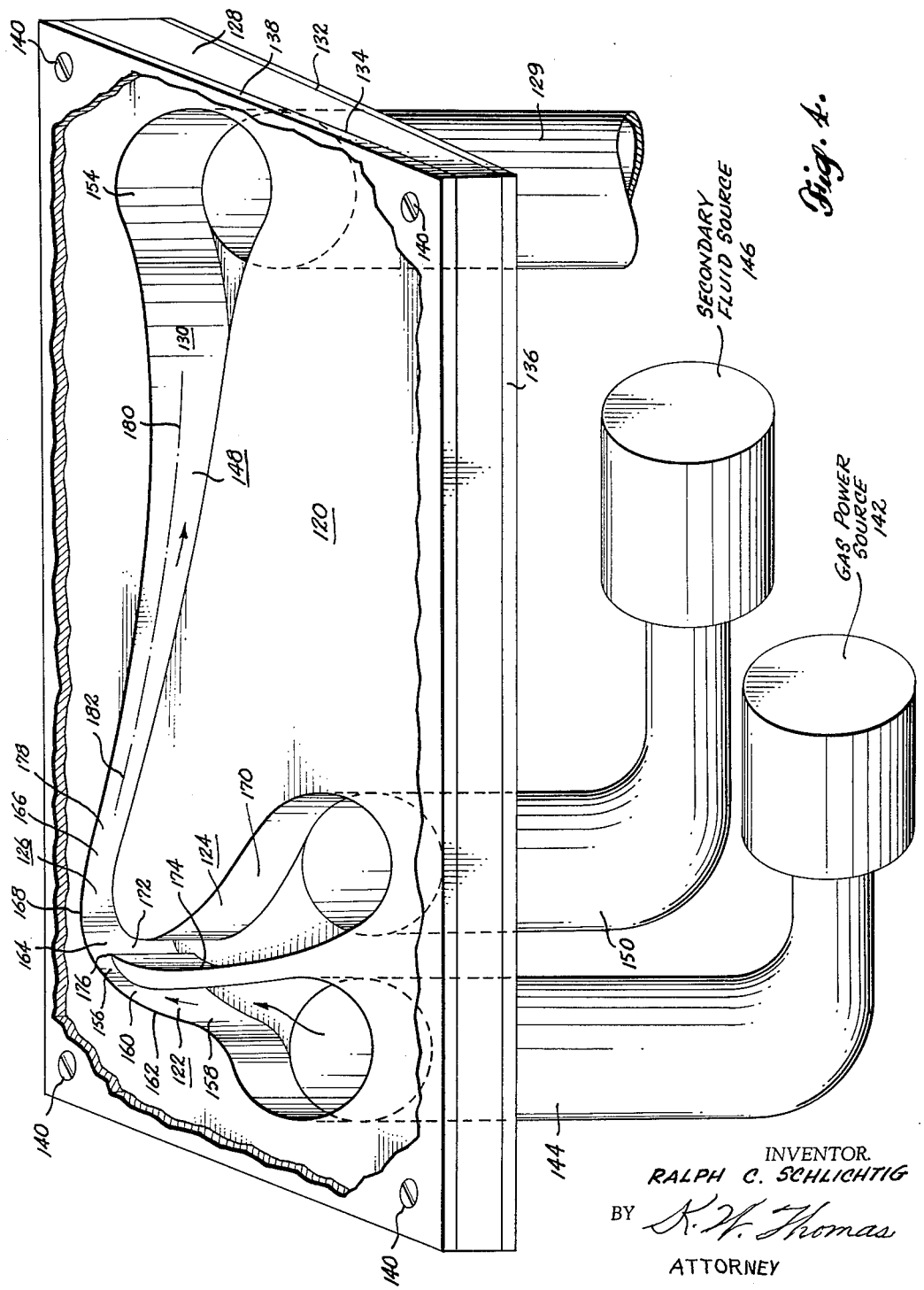

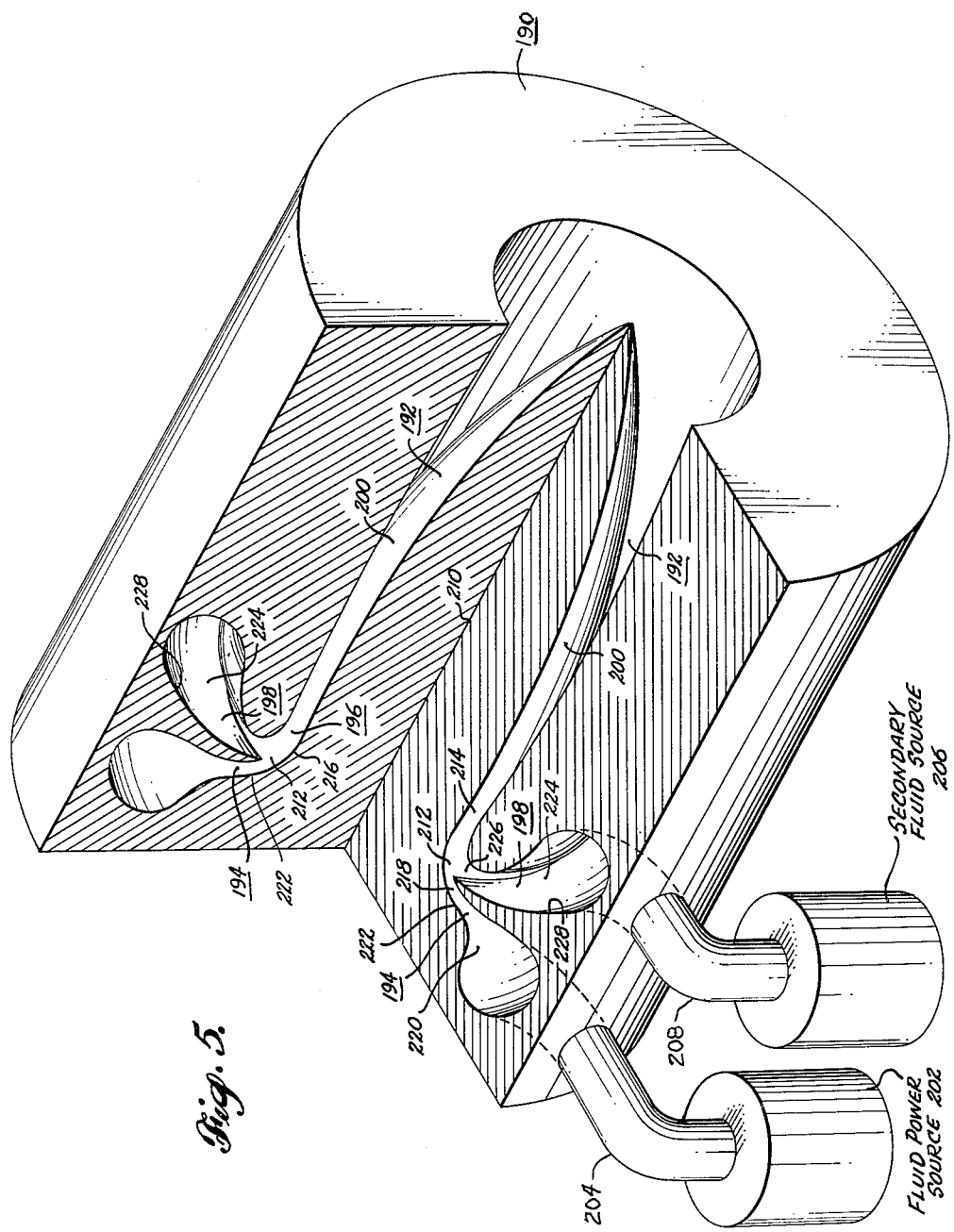

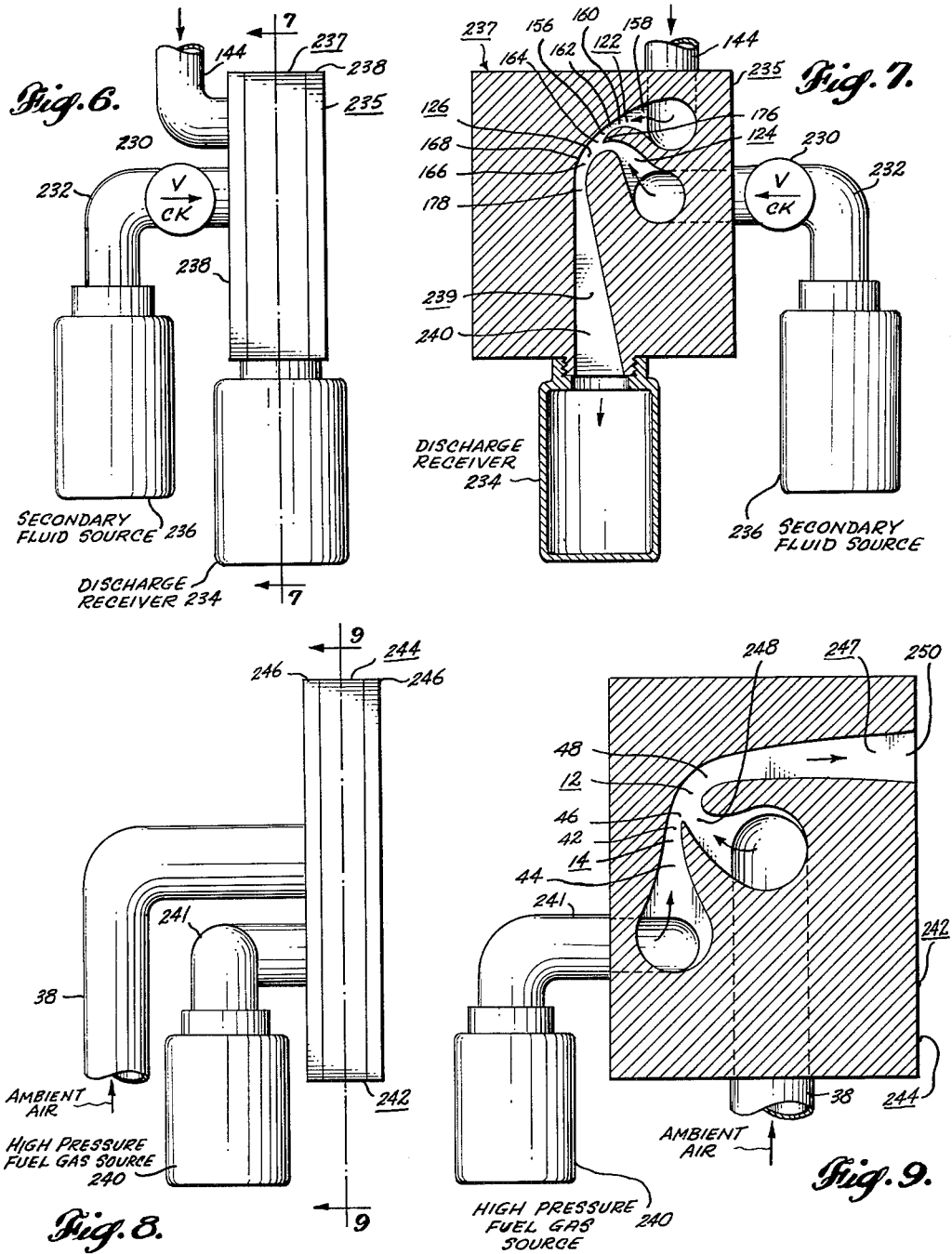

3,215,088
EJECTORS
Ralph C. Schlichtig, 11212 3rd S., Seattle, Wash.
Filed Nov. 1, 1962, Ser. No. 234,816
17 Claims. (Cl. 103—262)

This is a continuation-in-part application of patent application Serial No. 128,213 (now abandoned), filed July 31, 1961, by Ralph C. Schlichtig, the applicant herein, and entitled "Ejectors."

This invention relates to means for effecting a pumping action on a fluid or creating a partial vacuum, and more particularly to an ejector or jet pump employing centrifugal action within the jet stream.

Ejectors constructed according to the prior art require that all usable pressure energy of the power stream whether gas or liquid leaving the high pressure nozzle be converted to velocity energy distributed substantially uniformly across the discharge end of the high pressure nozzle. In such prior art ejectors the secondary fluid is introduced into the mixing compartment at a lower velocity than the power stream, and the secondary fluid stream surrounds the higher velocity power stream. Due to the mixing of these two masses of fluid at greatly different velocities, kinetic energy is degraded to nonusable heat energy. This accounts for the well known low efficiency of prior art ejectors. However, in these prior art ejectors the two fluid streams are mixed such that the total momentum is conserved.

Ejectors constructed according to the prior art which use gas for the power stream require that substantially all usable expansion and acceleration of the high pressure power stream take place before the gas leaves the high pressure nozzle. This expansion is adiabatic, and should be isentropic, as any further expansion of the high pressure gas after leaving the high pressure nozzle is uncontrolled and results in wasted work. The complete adiabatic expansion of the high pressure power stream within the high pressure nozzle causes its temperature to drop to a much lower level, in most cases considerably below the temperature of the secondary fluid stream. This power stream at greatly reduced temperature mixes with the much warmer secondary stream in the mixing compartment, thus producing an increase in entropy and a corresponding decrease in usable energy for pressure build-up in the discharge section of the ejector.

To secure maximum acceleration of the high pressure gas within the prior art gas type ejector, and thus a maximum of efficiency for the ejector, normally requires that the high pressure nozzle be constructed so it is convergent then divergent. This convergent-divergent high pressure nozzle must be specifically designed for each pressure ratio existing between the pressure of the gas entering the high pressure nozzle and the pressure to be maintained within the mixing compartment. In particular, the convergent-divergent high pressure nozzle must be designed so that there is a specific ratio of nozzle discharge area to the area of the throat of minimum transition section. Furthermore, the operation of prior art gas type ejectors depends on the high pressure power stream sharing its momentum with the slow moving secondary fluid stream after achieving maximum momentum and velocity in such a manner the momentum is conserved. But this involves loss of kinetic energy during mixing, as the velocity is inversely proportional to mass of flow when momentum is conserved, and kinetic energy decreases proportional to the square of the velocity. The kinetic energy is lost during turbulence of mixing, and becomes degraded heat energy. This explains the well known low mechanical efficiency of such prior art gas type ejectors.

According to the present invention, the difference in velocities betwen the fluid power stream and the fluid secondary stream at the common boundary between the two streams within the mixing compartment is reduced, to thus reduce the energy loss due to shock and turbulence, and thereby increase the efficiency. A reduction in velocity difference at the boundary between the two fluid streams is brought about by centrifugal forces. During the operation of an ejector built according to a teaching of this invention, centrifugal force is set up within the fluid power stream as it flows within the confines of a curved boundary surface of the mixing compartment so that the pressure within the mixing compartment at a position adjacent to the passageway which is in communication with a secondary fluid source is less than the pressure within the fluid power stream at a position adjacent to the curved boundary surface of the mixing compartment. Further, means is provided so that when the power stream is gas, the expansion of the gaseous power stream leaving the power stream passageway is restricted by centrifugal force so that the temperature difference between the fluid power stream and the fluid secondary stream is reduced.

Therefore, an object of this invention is to provide for increasing the efficiency of an ejector.

Another object of this invention is to provide for decreasing the difference between the velocities of the fluid power stream and the fluid secondary stream at the boundary layer between the two streams where they join in the mixing compartment of an ejector.

A further object of this invention is to provide for reducing the amount of temperature drop of the gaseous power stream within the mixing compartment of an ejector to thereby reduce the temperature difference between the gaseous power stream and the fluid secondary stream within the mixing compartment.

An additional object of this invention is to provide for reducing the absolute pressure at the secondary fluid source, to thereby increase the pressure ratio between the pressure of the discharge fluid and the pressure at the secondary fluid source.

A further object of this invention is to provide an ejector which is capable of efficient operation over a wide range of pressure ratios between the pressure of the fluid power stream entering the power stream passageway and the pressure of the fluid secondary stream where it enters the mixing compartment of the ejector.

Another object of this invention is to provide an ejector which is so constructed that it can mix a mutually reactable power stream and secondary stream so that the energy of the reaction can be used for increasing the velocity of the discharge stream resulting from the combined power stream and secondary stream.

Still another object of this invention is to provide an ejector which is so constructed that it can be easily modified to change the fluid handling capacity of the ejector without changing its other characteristics such as pressure ratios and mass flow ratios.

A more specific object of this invention is to provide an ejector which can be built in a sandwich type structure to thereby reduce its cost of manufacture.

Other objects of this invention will become apparent when taken in conjunction with the accompanying drawings in which:

FIG. 1 is an exploded view illustrating one embodiment of the teachings of this invention in which the fluid power stream may be either gas or liquid and enters the mixing compartment from a simple converging power stream passageway.

FIG. 2 shows the embodiment of FIG. 1 in the assembled condition.

FIG. 3 shows an ejector with one of its cover plates partly cut away for illustration purposes only, the ejector being a preferred embodiment of the teachings of this invention for use with either gas or liquid as the fluid power stream.

FIG. 4 shows an ejector with one of its cover plates partly cut away for illustration purposes only, the ejector being a preferred embodiment of the teachings of this invention when gas is to be used as the fluid power stream and there is a rather large pressure ratio between the pressure of the fluid power stream entering the power stream passageway and the pressure of the fluid in the secondary passageway at the junction of the secondary passageway and the mixing compartment of the ejector.

FIG. 5 shows an annular shaped ejector partly in section illustrating another embodiment of the teachings of this invention.

FIG. 6 is an end view of apparatus illustrating an application of this invention in which a check valve is positioned in the fluid secondary inlet connection so that the pressure within a discharge receiver connected in communication with the ejector can become as great as the pressure of the fluid power stream delivered to the ejector.

FIG. 7 is a sectional view of the apparatus of FIG. 6 taken along the line 7—7 of FIG. 6.

FIG. 8 is an end view of apparatus illustrating another application of this invention in which combustible fuel is supplied from an enclosure to the mixing compartment of the ejector to increase the velocity of the gaseous discharge stream from the ejector.

FIG. 9 is a sectional view of FIG. 8 taken along the line 9—9 of FIG. 8.

Referring to FIGS. 1 and 2 there is shown an ejector 10 illustrating one embodiment of the teachings of this invention in which the fluid power stream, which may be either gas or liquid, enters a curved mixing compartment 12 from a simple converging power stream passageway 14.

In general, the ejector 10 includes a median plate 16 having an opening 18 of predetermined shape which extends from a face 20, of the median plate 16, through to the opposite face 22 of the median plate 16; a cover plate 24 disposed against the face 20, of the median plate 16; a cover plate 26 disposed against the face 22 of the median plate 16; and a plurality of screws 28 for maintaining the cover plates 24 and 26 in fixed relationship with respect to the median plate 16, so that the combination of the median plate 16 and the cover plates 24 and 26 define a system of interconnected passageways including the curved mixing compartment 12, the power stream passageway 14 for receiving the fluid power stream, a secondary passageway 30, and a discharge passageway 32. The power stream passageway 14 receives the fluid power stream from a fluid power source 34 through an inlet connection 36 which is disposed in an opening in the cover plate 24 and suitably secured to the cover plate 24. One end of another inlet connection 38 is disposed in another opening in the cover plate 24 and is suitably secured to the cover plate 24. The other end of the inlet connection 38 is connected to be in communication with a secondary fluid source 40 so that the secondary passageway 30, and thus the mixing compartment 12, is in communication with the secondary fluid source 40. However, it is to be understood that an inlet connection (not shown) to the fluid power source 34, similar to the inlet connection 36, could be disposed in an opening in the cover plate 26 opposite the inlet connection 36 and suitably secured to the cover plate 26 as an addition to the inlet connection 36 or as a substitute thereof. Likewise, an inlet connection (not shown) to the secondary fluid source 40, similar to the inlet connection 38, could be disposed in another opening in the cover plate 26 opposite the inlet connection 38 and suitably secured to the cover plate 26 as an addition to the inlet connection 38 or as a substitute therefor.

The system of interconnected passageways including the mixing compartment 12, the power stream passageway 14, the secondary passageway 30 and the discharge passageway 32 could be defined by other than the sandwich structure shown in FIGS. 1 and 2. For instance, such a system of interconnected passageways could be defined by a single molded member or by a plurality of molded members (not shown) one for each of the passageways of such a system of interconnected passageways. However, certain advantages are obtained by utilizing a sandwich type structure to effect the desired system of interconnected passageways. One advantage is ease of manufacture and thus lower cost of manufacture. Another advantage is that by merely changing the thickness of the median plate, such as the plate 16, the fluid handling capacity of the ejector can be readily changed.

The converging power stream passageway 14, has a discharge end 42 and a receiving end 44, of larger cross-section than its discharge end 42, for receiving the fluid power stream. The converging power stream passageway 14 is provided so as to accelerate the fluid power stream received from the fluid power source 34 and guide the accelerated fluid power stream. On the other hand, the curved mixing compartment 12 has a receiving end 46 and a discharge end 48, the curved mixing compartment 12 being curved in direction from its receiving end 46 to its discharge end 48 and being bounded in part by a curved outer boundary surface 50 which likewise curves in direction from the receiving end 46 to the discharge end 48.

As shown, the discharge end 42, of the power stream passageway, is in communication with the receiving end 46, of the curved mixing compartment 12. The power stream passageway 14 is so positioned as to direct the accelerated fluid power stream through the receiving end 46 of the curved mixing compartment 12 and continuously along the curved outer boundary surface 50 of the curved mixing compartment 12, whereby centrifugal force is set up within the accelerated fluid power stream within the curved mixing compartment 12, to thereby effect an energy gradient in the accelerated fluid power stream, within the curved mixing compartment 12, in direction toward the curved outer boundary surface 50, of the curved mixing compartment 12, with the greatest energy at the curved outer boundary surface 50, and also to effect a pressure gradient in the accelerated fluid power stream, within the curved mixing compartment 12, in a direction toward the curved outer boundary surface 50 of the curved mixing compartment 12 with the greatest pressure within the accelerated fluid power stream at the curved outer boundary surface 50 and with the least pressure within the mixing compartment's accelerated fluid power stream furthest from the curved outer boundary surface 50.

In the embodiment shown in FIGS. 1 and 2 the secondary passageway 30 is substantially straight and of substantially uniform cross-section throughout its length. The secondary passageway 30 has a receiving end 52 in communication with the secondary fluid source 40 and a discharge end 54 in communication with the receiving end 46 of the curved mixing compartment 12. Thus, the secondary passageway 30 effects a communication between the secondary fluid source 40 and the receiving end 46 of the curved mixing compartment 12. In operation, the secondary fluid within the secondary passageway 30 may be static, in which case it maintains a partial vacuum within the secondary fluid source 40. On the other hand, the secondary fluid may be flowing in which case it is accelerated by the fluid power stream which is within the curved mixing compartment 12. As shown, the secondary passageway 30 is positioned to direct the fluid secondary stream flowing therewithin into contact with the fluid power stream within the curved mixing compartment 12.

The discharge passageway 32 has a receiving end 56 which is positioned to be in communication with the discharge end 48, of the curved mixing compartment 12, so as to be a continuation of the curved mixing compartment 12. As illustrated, the discharge passageway 32 diverges continuously from its receiving end 56 to its discharge end 58 and is positioned to receive, at its receiving end 56, the accelerated fluid power stream from the discharge end 48 of the curved mixing compartment 12.

The operation of the ejector 10 shown in FIGS. 1 and 2 will now be described with the assumption that the fluid power stream is a liquid. The liquid power stream received from the fluid power source 34 through the inlet connection 36 enters the receiving end 44 of the power stream passageway 14 at a pressure considerably higher than the pressure existing at the discharge end 58 of the discharge passageway 32. The liquid power stream is accelerated to a high velocity as it flows through the converging power stream passageway 14 and is then directed through the receiving end 46 of the curved mixing compartment 12 so that the flow of the liquid power stream is continuous along the curved outer boundary surface 50 of the curved mixing compartment 12, whereby centrifugal force is set up within the accelerated liquid fluid power stream within the curved mixing compartment 12 to thereby effect an energy gradient in the accelerated liquid power stream within the curved mixing compartment 12 in a direction toward the curved outer boundary surface 50 with the greatest energy at the curved outer boundary surface 50, and also to effect a pressure gradient in the accelerated liquid power stream within the curved mixing compartment 12 in a direction toward the curved outer boundary surface 50 of the curved mixing compartment 12 with the greatest pressure within the accelerated liquid power stream at the curved outer boundary surface 50 and with the least pressure within the mixing compartment's accelerated liquid power stream furthest from the curved outer boundary surface 50. Thus, the pressure within the curved mixing compartment 12 furthest from the curved outer boundary surface 50 is reduced to a value less than the pressure existing at the discharge end 58 of the discharge passageway 32 and this pressure reduction may be termed a partial vacuum. If the secondary fluid within the secondary passageway 30 is in static equilibrium a partial vacuum is maintained in the secondary fluid source 40. However, if the pressure within the secondary fluid source 40 hasn't reached a value as low as the lowest pressure within the curved mixing compartment 12 a fluid secondary stream will flow from the secondary fluid source 40 through the inlet connection 38 and the secondary passageway 30 to the receiving end 46 of the curved mixing compartment 12. Such fluid flow through the secondary passageway 30, which can be either liquid or gas, is directed to flow into contact with the accelerated liquid power stream within the curved mixing compartment 12 where it is accelerated by the liquid power stream and partially mixed with the liquid power stream. The liquid power stream and any fluid secondary stream within the curved mixing compartment 12 continues to flow into the discharge passageway 32 where it is decelerated so that the kinetic energy of the fluid flowing in the discharge passageway 32 is converted to pressure energy.

On the other hand, if in operation the fluid power stream is a gas the gaseous power stream flows from the fluid power source 34 through the inlet connection 36 and the power stream passageway 14 and into the curved mixing compartment 12 in a manner similar to that hereinbefore described with reference to a liquid power stream. On entering the curved mixing compartment 12 the gaseous power stream flows continuously along the curved outer boundary surface 50 of the curved mixing compartment 12, whereby centrifugal force is set up within the accelerated gaseous power stream within the curved mixing compartment 12 to thereby effect a pressure gradient in the accelerated gaseous power stream within the curved mixing compartment 12 in direction toward the curved outer boundary surface 50 of the curved mixing compartment 12 with the greatest pressure at the curved outer boundary surface 50 which compresses the portion of the accelerated gaseous power stream flowing along the curved boundary surface 50. The energy required for compressing this portion of the accelerated gaseous power stream within the curved mixing compartment 12 is drawn from the kinetic energy of that portion of the accelerated gaseous power stream that is within the curved mixing compartment 12 and furthest away from the curved boundary surface 50, thus reducing the velocity of that portion of the accelerated gaseous power stream that is within the curved mixing compartment 12 and is farthest away from the curved outer boundary surface 50. Thus, an energy gradient is produced in the accelerated gaseous power stream within the curved mixing compartment 12 in a direction toward the curved outer boundary surface 50 of the curved mixing compartment 12 with the greatest energy at the curved outer boundary surface 50. If the secondary fluid within the secondary passageway 30 is in static equilibrium, a partial vacuum is maintained in the secondary fluid source 40. However, if the pressure within the secondary fluid source 40 hasn't reached a value as low as the lowest pressure within the curved mixing compartment 12, a fluid secondary stream will flow from the secondary fluid source 40 through the inlet connection 38 and the secondary passageway 30 to the receiving end 46 of the curved mixing compartment 12. Such fluid flow through the secondary passageway 30, which can be either liquid or gas, is directed to flow into contact with that portion of the accelerated gaseous power stream within the curved mixing compartment 12 which is farthest away from the curved outer boundary surface 50 and which has the lowest velocity. Since the velocity of that portion of the gaseous power stream that is within the curved mixing compartment 12 and is farthest away from the curved outer boundary surface 50 has been reduced as described hereinbefore, the kinetic energy loss due to shock occurring within the curved mixing compartment 12 between the accelerated gaseous power stream and the slower fluid secondary stream is correspondingly reduced, thereby reducing turbulence and thus effecting an efficient ejector.

In operation, as the gaseous power stream within the curved mixing compartment 12 approaches the discharge end 48 of the curved mixing compartment 12 where the curvature of the curved outer boundary surface 50 is less, the centrifugal force hereinbefore mentioned is relaxed and that portion of the gaseous power stream flowing along the closest to the curved outer boundary surface 50 expands, and in so doing transmits kinetic energy and momentum to that portion of the gaseous power stream within the curved mixing compartment 12 and farthest away from the curved outer boundary surface 50, and thus in turn transmits kinetic energy and momentum to the fluid secondary stream within the curved mixing compartment 12 without shock and turbulence, to thereby accelerate the fluid secondary stream with high efficiency.

The gaseous power stream and any fluid secondary stream mixed with the gaseous power stream within the curved mixing compartment continuous to flow into the discharge passageway 32 where it is decelerated so that the kinetic energy of the fluid flowing in the discharge passageway 32 is converted to pressure energy.

Referring to FIG. 3 there is illustrated a preferred ejector 60, embodying the teachings of this invention, for use with either gas or liquid as the fluid power stream. In general, the ejector 60 includes a median plate 62 having an opening 64 of predetermined shape which extends from a face 66 of the median plate 62 through to the opposite face 68 of the median plate 62; a cover plate 70 disposed against the face 66 of the median plate 62; a cover plate 72 all of the surfaces of which are continuous except for a plurality of openings for a plurality of screws 74, the cover plate 72 being similar to the cover plate 26 shown in FIGS. 1 and 2 and being disposed against the face 68 of the median plate 62; and the plurality of screws 74 for maintaining the cover plates 70 and 72 in fixed relationship with respect to the median plate 62, so that the combination of the median plate 62 and the cover plates 70 and 72 define a system of interconnected passageways including a curved converging power stream passageway 76 for receiving the fluid power stream from a fluid power source 78 through an inlet connection 80, a curved mixing compartment 82, a curved converging secondary passageway 84 for effecting a communication between the curved mixing compartment 82 and a secondary fluid source 86, and a discharge passageway 88. In particular, the curved converging power stream passageway 76 receives the fluid power stream from the fluid power source 78 through the inlet connection 80 which is disposed in an opening in the cover plate 70 and suitably secured to the cover plate 70. One end of another inlet connection 90 is disposed in another opening in the cover plate 70 and is suitably secured to the cover plate 70. The other end of the inlet connection 90 is connected to be in communication with the secondary fluid source 86 so that the curved converging secondary passageway 84 and the mixing compartment 82 are in communication with the secondary fluid source 86. Additional or fewer inlet connections to the curved converging power stream passageway 76 and the curved converging secondary passageway 84 can be provided as described hereinbefore with reference to the ejector 10 shown in FIGS. 1 and 2. Likewise, other means such as described with reference to the ejector 10 of FIGS. 1 and 2 could be used to define the system of interconnected passageways shown in FIG. 3.

The curved converging power stream passageway 76, which has a discharge end 92 and a receiving end 94 of larger cross-section than its discharge end 92 for receiving the fluid power stream, converges from the receiving end 94 to the discharge end 92. Thus, the curved converging power stream passageway 76 is so shaped as to accelerate the fluid power stream within the curved converging power stream passageway 76 and create an energy gradient in the accelerated fluid power stream in a direction transverse to the flow direction of the accelerated fluid power stream and a pressure gradient in the accelerated fluid power stream in a direction transverse to the flow direction of the accelerated fluid power stream, so that a portion of the accelerated fluid power stream has the greatest total unit pressure energy and unit kinetic energy. In particular, the converging of the power stream passageway 76 from its receiving end 94 to its discharge end 92 accelerates the fluid power stream within the power stream passageway 76. The power stream passageway 76 is curved in direction from its receiving end 94 to its discharge end 92 and is bounded in part by a curved outer boundary surface 96 which curves in direction from the receiving end 94 of the power stream passageway 76 to the discharge end 92, whereby centrifugal force is set up within the accelerated fluid power stream within the power stream passageway to thereby effect an energy gradient in the accelerated fluid power stream in a direction transverse to the flow direction of the accelerated fluid power stream and toward the curved outer boundary surface 96 and a pressure gradient in the accelerated fluid power stream in a direction transverse to the flow direction of the accelerated fluid power stream and toward the curved outer boundary surface 96, so that the portion of the accelerated fluid power stream flowing along the curved outer boundary surface 96 of the power stream passageway 76 has the greatest total unit pressure energy and unit kinetic energy.

The curved mixing compartment 82 has a receiving end 98, which is in communication with the discharge end 92 of the power stream passageway 76, and a discharge end 100. The curved mixing compartment 82 is curved in direction from its receiving end 98 to its discharge end 100 and is bounded in part by a curved outer boundary surface 102 which likewise curves in direction from the receiving end 98 of the curved mixing compartment 82 to the discharge end 100, the curved outer boundary surface 102 forming a continuous curve with the curved outer boundary surface 96 of the power stream passageway 76. The curvature of the curved outer boundary surface 102 has the same algebraic sign as the curvature of the curved outer boundary surface 96.

The curved converging power stream passageway 76 is so positioned as to direct the accelerated fluid power stream through the receiving end 98 of the curved mixing compartment 82 in such a way that the portion of the accelerated fluid power stream of greatest total unit pressure energy and unit kinetic energy flows continuously along the curved outer boundary surface 102 of the curved mixing compartment 82, whereby centrifugal force maintains within the accelerated fluid power stream within the curved mixing compartment 82 a pressure gradient and an energy gradient in direction toward the curved outer boundary surface 102 such that the total unit pressure energy and unit kinetic energy of the accelerated fluid power stream is greatest along the curved outer boundary surface 102. Thus, the region of lowest pressure within the accelerated fluid power stream within the curved mixing compartment 82 is at a region which is farthest from the curved outer boundary surface 102.

In the embodiment shown in FIG. 3 the secondary passageway 84 is both curved and converging. The secondary passageway 84 has a receiving end 104 in communication with the secondary fluid source 86 and a discharge end 106 in communication with the receiving end 98 of the curved mixing compartment 82. Thus, the secondary passageway 84 effects a communication between the secondary fluid source 86 and the receiving end 98 of the curved mixing compartment 82. As will be explained more fully hereinafter, in operation, the secondary fluid within the secondary passageway 84 may be static, in which case it maintains a partial vacuum within the secondary fluid source 86. On the other hand, the secondary fluid may be flowing, in which case it is accelerated by the fluid power stream which is within the curved mixing compartment 82.

The secondary passageway 84 is so shaped as to accelerate the fluid secondary stream within the secondary passageway 84 and create an energy gradient in the accelerated fluid secondary stream in direction transverse to the flow direction of the accelerated fluid secondary stream and create a pressure gradient in the accelerated fluid secondary stream in direction transverse to the flow direction of the accelerated fluid secondary stream, so that a portion of the accelerated fluid secondary stream has the greatest total unit pressure energy and unit kinetic energy. In particular, in order to accelerate the fluid secondary stream within the secondary passageway 84, the secondary passageway 84 converges from its receiving end 104 to its discharge end 106. The secondary passageway 84 curves in direction from its receiving end 104 to its discharge end 106 and is bounded in part by a curved outer boundary surface 108 which likewise curves in direction from the receiving end 104 to a point of confluence 110 between the discharge end 106 of the secondary passageway 84 and the discharge end 92 of the power stream passageway 76, so as to create an energy gradient in the accelerated fluid secondary stream in direction transverse to the flow direction of the accelerated fluid secondary stream and create a pressure gradient in the accelerated fluid secondary stream in direction transverse to the flow direction of the accelerated fluid secondary stream, so that the portion of the accelerated fluid secondary stream flowing along the curved boundary surface 108 of the secondary passageway 84 has the greatest total unit pressure energy and unit kinetic energy. As shown, the curvature of the curved outer boundary surface 108 of the secondary passageway 84 has the same algebraic sign as the curvature of the curved outer boundary surface 96 of the power stream passageway 76. The secondary passageway 84 is so positioned as to direct the accelerated fluid secondary stream into the curved mixing compartment 82 in such a way that the portion of the accelerated fluid secondary stream of greatest total unit pressure energy and unit kinetic energy flows in contact with the accelerated fluid power stream within the curved mixing compartment 84, whereby the accelerated fluid secondary stream is further accelerated and partially mixed with the accelerated fluid power stream to form a partially mixed fluid stream. In optimum operation the mixing of the accelerated fluid power stream and the fluid secondary stream within the curved mixing compartment 82 is only sufficient to effect a linkage between the two streams so that the fluid secondary stream can be accelerated by the accelerated fluid power stream.

Referring in particular to the discharge passageway 88, this passageway has a discharge end 111 and a receiving end 112 which is in communication with the discharge end 100 of the curved mixing compartment 82 for receiving from the curved mixing compartment 82 the partially mixed fluid stream or simply the accelerated fluid power stream if no secondary fluid is flowing in the system. The discharge passageway 88 has a curved longitudinal axis 114, the curvature of which adjacent the discharge end 100 of the mixing compartment 82 has the same algebraic sign as the curvature of the curved outer boundary surface 102. The curvature of the curved longitudinal axis 114 goes through zero at a point 116 and is in this instance of opposite sides of the point 112. Since, the curvature of the longitudinal axis 114 goes through zero the flow path of the partially mixed fluid stream or the accelerated fluid power stream if no secondary fluid is flowing in the system is changed so that the total unit pressure energy and unit kinetic energy of the partially mixed fluid stream or the accelerated fluid power stream approaches a uniform value at all points in direction transverse to the flow direction of the partially mixed fluid stream or fluid power stream.

The operation of the ejector 62 of FIG. 3 will now be described with the assumption that the fluid power stream is a liquid. The liquid power stream received from the fluid power source 78 through the inlet connection 80 enters the receiving end 94 of the power stream passageway 76 at a pressure considerably higher than the pressure existing at the discharge end 111 of the discharge passageway 88. The liquid power stream is accelerated to a high velocity as it flows through the curved converging power stream passageway 76 where centrifugal force creates a pressure gradient and an energy gradient in the accelerated liquid power stream in direction transverse to the flow direction of the accelerated liquid power stream, so that the portion of the accelerated liquid power stream closest to the curved outer boundary surface 96 has the greatest total unit pressure energy and unit kinetic energy. Then the accelerated liquid power stream is directed through the receiving end 98 of the curved mixing compartment 82 in such a way that the portion of the accelerated liquid power stream of greatest total unit pressure energy and unit kinetic energy flows continuously along the curved outer boundary surface 102 of the curved mixing compartment 82, whereby centrifugal force maintains within the accelerated liquid power stream within the curved mixing compartment 82 a pressure gradient and an energy gradient in direction toward the curved outer boundary surface 102 such that the total unit pressure energy and unit kinetic energy of the accelerated fluid power stream is greatest along the curved outer boundary surface 102 and is least in the region within the curved mixing compartment 82 farthest away from the curved outer boundary surface 102. Thus, the pressure within the curved mixing compartment 82 farthest away from the curved outer boundary surface 102 is reduced to a value less than the pressure existing at the discharge end 111 of the discharge passageway 88 and this reduced pressure may be termed a partial vacuum. If the secondary fluid within the secondary passageway 84 is in static equilibruim a partial vacuum is maintained in the secondary fluid source 86. However, if the pressure within the secondary fluid source 86 hasn't reached a value as low as the lowest pressure within the curved mixing compartment 82 a fluid secondary stream, which may be either gas or liquid, will flow through the inlet connection 90 and the secondary passageway 84 to the receiving end 98 of the curved mixing compartment 82. The fluid secondary stream is accelerated within the secondary passageway 84 wherein centrifugal force creates a pressure gradient and an energy gradient in the accelerated fluid secondary stream in direction transverse to the flow direction of the accelerated fluid secondary stream so that the portion of the accelerated fluid secondary stream closest to the curved outer boundary surface 108 has the greatest unit pressure energy and unit kinetic energy. The accelerated fluids econdary stream is directed by the secondary passageway 84 into the curved mixing compartment 82 in such a way that the portion of the accelerated fluid secondary stream of greatest total unit pressure energy and unit kinetic energy flows into contact with that portion of the accelerated liquid power stream within the curved mixing compartment 82 of least total unit pressure energy and unit kinetic energy, where the fluid secondary stream is accelerated by the liquid power stream and partially mixed therewith. Since the kinetic energy difference between the liquid power stream and the fluid secondary stream within the curved mixing compartment 82 at the contact region between them has been minimized, the velocity difference between these two streams at this contact region has likewise been minimized. This results in a minimum of kinetic energy loss due to shock and turbulence, thus effecting a very efficient ejector.

The liquid power stream and any fluid secondary stream within the curved mixing compartment 82 continues to flow into the discharge passageway 88 where the total unit pressure energy and unit kinetic energy of the liquid power stream or partially mixed fluid stream approaches a uniform value at all points in direction transverse to the flow direction of the liquid power stream or partially mixed fluid stream.

On the other hand, if in operation the fluid power stream is a gas the gaseous power stream flows from the fluid power source 78 through the inlet connection 80 and the power stream passageway 76 and into the curved mixing compartment 82 in a manner similar to that hereinbefore described with reference to the ejector 62 when a liquid power stream is used. On entering the curved mixing compartment 82 the portion of the gaseous power stream of greatest total unit pressure energy and unit kinetic energy flows continuously along the curved outer boundary surface 102 of the curved mixing compartment 82 where centrifugal force maintains a pressure gradient in the accelerated gaseous power stream within the curved mixing compartment 82 in direction toward the curved outer boundary surface 102 of the curved mixing compartment 82, with the greatest pressure at the curved outer boundary surface 102 which compresses the portion of the accelerated gaseous power stream flowing along the curved outer boundary surface 102. The energy required for compressing this portion of the accelerated gaseous power stream within the curved mixing compartment 82 is drawn from the kinetic energy of that portion of the accelerated gaseous power stream that is within the curved mixing compartment 82 and farthest away from the curved outer boundary surface 102, thus reducing the velocity of that portion of the accelerated gaseous power stream within the curved mixing compartment 82 and farthest away from the curved outer boundary surface 102. Thus, an energy gradient is produced in the accelerated gaseous power stream within the curved mixing compartment 82 in direction toward the curved outer boundary surface 102 of the curved mixing compartment 82, with the greatest energy at the curved outer boundary surface 102. If in operation the secondary fluid within the secondary passageway 84 is in static equilibrium a partial vacuum is maintained in the secondary fluid source 86. However, if the pressure within the secondary fluid source 86 hasn't reached a value as low as the lowest pressure within the curved mixing compartment 82, a fluid secondary stream will flow from the secondary fluid source 86 through the inlet connection 90 and the secondary passageway 84 to the receiving and 98 of the curved mixing compartment 82. The accelerated fluid secondary stream, which may be either liquid or gas, is directed by the secondary passageway 84 into the curved mixing compartment 82 in such a way that the portion of the accelerated fluid secondary stream of greatest unit pressure energy and unit kinetic energy flows into contact with that portion of the accelerated gaseous power stream within the curved mixing compartment 82 of least total unit pressure energy and unit kinetic energy, where the fluid secondary stream is accelerated by the gaseous power stream and partially mixed therewith. Since the kinetic energy difference between the gaseous power stream and the fluid secondary stream within the curved mixing compartment 82 at the contact region between them has been minimized, the velocity difference between these two streams at this contact region has likewise been minimized. This results in a minimum of kinetic energy loss due to shock and turbulence, thus effecting a very efficient ejector.

In operation, as the gaseous power stream within the curved mixing compartment 82 approaches the discharge end 100 of the curved mixing compartment 82 where the curvature of the curved outer boundary surface 102 is less, the centrifugal force hereinbefore mentioned is relaxed as the centrifugal force is proportional to the curvature of the surface 102, and that portion of the gaseous power stream flowing along and closest to the curved outer boundary surface 102 expands and in so doing transmits kinetic energy and momentum to that portion of the gaseous power stream within the curved mixing compartment 82 and farthest away from the curved outer boundary surface 102, and thus in turn transmits kinetic energy and momentum to the fluid secondary stream within the curved mixing compartment 82 without shock and turbulence, to thereby accelerate the fluid secondary stream with high efficiency.

The gaseous power stream and any fluid secondary stream within the curved mixing compartment 82 continues to flow into the discharge passageway 88 where the total unit pressure energy and unit kinetic energy of the gaseous power stream or partially mixed fluid stream approaches a uniform value at all points in direction transverse to the flow direction of the gaseous power stream or partially mixed fluid stream.

Referring to FIG. 4 there is illustrated an ejector 120 which is a preferred embodiment of the teachings of this invention when gas is to be used as the fluid power stream and there is a rather large pressure ratio between the pressure of the fluid power stream entering a curved converging-diverging power stream passageway 122 and the pressure of the fluid in a curved converging secondary passageway 124 at the junction of the curved converging secondary passageway 124 and a curved mixing compartment 126. The main distinction between the ejector 120 of FIG. 4 and the ejector 62 of FIG. 3 is that in the ejector 120 the curved converging-diverging power stream passageway 122 is provided instead of the curved converging power stream passageway 76 as shown in FIG. 3, and a wedge shaped median plate 128 is provided instead of the flat median plate 62 as shown in FIG. 3, and a discharge connection 129 is provided for discharging the fluid to a receiver (not shown) instead of discharging the fluid directly to ambient air as in the case of ejector 62 of FIG. 3. However, the discharge connection 129 is optional depending upon the application to be made of the ejector 120 and when not employed the ejector 120 should be modified so that its discharge end appears similar to that of the ejector 62 of FIG. 3. Of course, the ejector 62, of FIG. 3, could be modified so as to be provided with a discharge connection (not shown) similar to the discharge connection 129 of FIG. 4.

In general, the ejector 120 includes the wedge shaped median plate 128 having an opening 130 of predetermined shape which extends from a face 132 of the wedge shaped median plate 128 through to the opposite face 134 of the wedge shaped median plate 128; a cover plate 136 disposed against the face 132 of the wedge shaped median plate 128; a cover plate 138 all of the surfaces of which are continuous except for a plurality of openings for a plurality of screws 140, the cover plate 138 being similar to the cover plate 26 shown in FIGS. 1 and 2 and being disposed against the face 134 of the wedge shaped median plate 128; and the plurality of screws 140 for maintaining the cover plates 136 and 138 in fixed relationship with respect to the wedge shaped median plate 128, so that the combination of the wedge shaped median plate 128 and the cover plates 136 and 138 define a system of inter-connected passageways including the curved converging-diverging power stream passageway 122 for receiving the gaseous power stream from a gas power source 142 through an inlet connection 144, the curved mixing compartment 126, the curved converging secondary passageway 124 for effecting a communication between the curved mixing compartment 126 and a secondary fluid source 146, and a discharge passageway 148. In particular, the curved converging-diverging power stream passageway 122 receives the gaseous power stream from the gas power source 142 through the inlet connection 144 which is disposed in an opening in the cover plate 136 and suitably secured to the cover plate 136. One end of another inlet connection 150 is disposed in another opening in the cover plate 136 and is suitably secured to the cover plate 136. The other end of the inlet connection 150 is connected to be in communication with the secondary fluid source 146 so that the curved converging secondary passageway 124 and the curved mixing compartment 126 are in communciation with the secondary fluid source 146. In order to connect the discharge passageway 148 to a receiver (not shown) one end of the discharge connection 129 is disposed in another opening in the cover plate 136 and is suitably secured to the cover plate 136 so as to be in communication with the discharge end 154 of the discharge passageway 148. Additional or fewer inlet connections to the curved converging-diverging power stream passageway 122 and the curved converging secondary passageway 124 can be provided as described hereinbefore with reference to the ejector 10 shown in FIGS. 1 and 2. As is well known in the art any one of the connections 144, 150 or 129 can be removed so as to provide direct access to ambient air at that one particular location. Likewise, other means such as described with reference to the ejector 10 of FIGS. 1 and 2 could be used to define the system of interconnected passageways shown in FIG. 4.

The curved converging-diverging power stream passageway 122 has a diverging discharge end 156 and a converging receiving end 158 for receiving the gaseous power stream. Thus, the converging-diverging power stream passageway 122 has a restricted throat 160 and is so shaped as to accelerate the gaseous power stream within the curved converging-diverging power stream passageway 122 and create an energy gradient in the accelerated gaseous power stream in direction transverse to the flow direction of the accelerated gaseous power stream and a pressure gradient in the accelerated gaseous power stream in direction transverse to the flow direction of the accelerated gaseous power stream, so that a portion of the accelerated gaseous power stream has the greatest total unit pressure energy and unit kinetic energy. The power stream passageway 122 is curved in direction from its receiving end 158 to its discharge end 156 and is bounded in part by a curved outer boundary surface 162 which curves in direction from the receiving end 158 of the power stream passageway 122 to the discharge end 156, whereby centrifugal force is set up within the accelerated gaseous power stream within the power stream passageway 122 to thereby effect an energy gradient in the accelerated gaseous power stream in direction transverse to the flow direction of the accelerated gaseous power stream and toward the curved outer boundary surface 162 and a pressure gradient in the accelerated gaseous power stream in direction transverse to the flow direction of the accelerated gaseous power stream and toward the curved outer boundary surface 162, so that the portion of the accelerated gaseous power stream flowing along the curved outer boundary surface 162 of the power stream passageway 122 has the greatest total unit pressure energy and unit kinetic energy.

The curved mixing compartment 126 has a receiving end 164, which is in communication with the discharge end 156 of the power stream passageway 122, and a discharge end 166. The curved mixing compartment 126 is curved in direction from its receiving end 164 to its discharge end 166 and is bounded in part by a curved outer boundary surface 168 which likewise curves in direction from the receiving end 164 of the curved mixing compartment 126 to the discharge end 166, the curved outer boundary surface 168 forming a continuous curve with the curved outer boundary surface 162 of the converging-diverging power stream passageway 122. The curvature of the curved outer boundary surface 168 has the same algebraic sign as the curvature of the curved outer boundary surface 162. The curved converging-diverging power stream passageway 122 is so positioned as to direct the accelerated gaseous power stream through the receiving end 164 of the curved mixing compartment 126 in such a way that the portion of the accelerated gaseous power stream of greatest total unit pressure energy and unit kinetic energy flows continuously along the curved outer boundary surface 168 of the curved mixing compartment 126, whereby centrifugal force maintains within the accelerated gaseous power stream within the curved mixing compartment 126 a pressure gradient and an energy gradient in direction toward the curved outer boundary suface 168 such that the total unit pressure energy and unit kinetic energy of the accelerated gaseous power stream is greatest along the curved outer boundary surface 168. Thus, the region of lowest pressure within the accelerated gaseous power stream within the curved mixing compartment 126 is at a region which is farthest away from the curved outer boundary surface 168.

In the embodiment shown in FIG. 4 the curved converging secondary passageway 124 has a receiving end 170 in communication with the secondary fluid source 146 and a discharge end 172 in communication with the receiving end 164 of the curved mixing compartment 126. Thus, the curved converging secondary passageway 124 effects a communication between the secondary fluid source 146 and the receiving end 164 of the curved mixing compartment 126. In operation, the secondary fluid within the curved converging secondary passageway 124 may be static, in which case it maintains a partial vacuum within the secondary fluid source 146. On the other hand, the secondary fluid may be flowing in which case it is accelerated by the gaseous power stream which is within the curved mixing compartment 126.

The curved coverging secondary passageway 124 is so shaped as to accelerate the fluid secondary stream within the curved converging secondary passageway 124 and create an energy gradient in the accelerated fluid secondary stream in direction transverse to the flow direction of the accelerated fluid secondary stream and create a pressure gradient in the accelerated fluid secondary stream in direction transverse to the flow direction of the accelerated fluid secondary stream, so that a portion of the accelerated fluid secondary stream has the greatest total unit pressure energy and unit kinetic energy. In particular, in order to accelerate the fluid secondary stream within the secondary passageway 124, the secondary passageway 124 converges from its receiving end 170 to its discharge end 172. The secondary passageway 124 curves in direction from its receiving end 170 to its discharge end 172 and is bounded in part by a curved boundary surface 174 which likewise curves in direction from the receiving end 170 to a point of confluence 176 between the discharge end 172 of the secondary passageway 124 and the discharge end 156 of the converging-diverging power stream passageway 122, so as to create an energy gradient in the accelerated fluid secondary stream in direction transverse to the flow direction of the accelerated fluid secondary stream and create a pressure gradient in the accelerated fluid secondary stream in direction transverse to the flow direction of the accelerated fluid secondary stream, so that the portion of the accelerated fluid secondary stream flowing along the curved boundary surface 174 of the curved converging secondary passageway 124 has the greatest total unit pressure energy and unit kinetic energy. As shown, the curvature of the curved outer boundary surface 174 of the curved converging secondary passageway 124 has the same algebraic sign as the curvature of the curved outer boundary surface 162 of the converging-diverging power stream passageway 122. The curved converging secondary passageway 124 is so positioned as to direct the accelerated fluid secondary stream into the curved mixing compartment 126 in such a way that the portion of the accelerated fluid secondary stream of greatest total unit pressure energy and unit kinetic energy flows in contact with the accelerated gaseous power stream within the curved mixing compartment 126, whereby the accelerated fluid secondary stream is further accelerated and partially mixed with the accelerated gaseous power stream to form a partially mixed fluid stream.

Referring in particular to the discharge passageway 148, this passageway has a receiving end 178 and the discharge end 154, the receiving end 178 being in communication with the discharge end 166 of the curved mixing compartment 126 for receiving from the curved mixing compartment 126 the partially mixed fluid stream or the accelerated gaseous power stream if no secondary fluid is flowing in the system. The discharge passageway 148 has a curved longitudinal axis 180, the curvature of which adjacent the discharge end 166 of the curved mixing compartment 126 has the same algebraic sign as the curvature of the curved outer boundary surface 168. The curvature of the curved longitudinal axis 180 goes through zero at a point 182 and is in this instance of opposite algebraic sign on opposite sides of the point 182. Since, the curvature of the longitudinal axis 180 goes through zero the flow path of the partially mixed fluid stream or the accelerated gaseous power stream if no secondary fluid is flowing in the system is changed so that the total unit pressure energy and unit kinetic energy of the accelerated gaseous power stream or the partially mixed fluid stream approaches a uniform value at all points in direction transverse to the flow direction of the partially mixed fluid stream of the accelerated gaseous power stream.

The operation of the ejector 120 of FIG. 4 is similar to the operation of the ejector 62 of FIG. 3 when the fluid power stream is gas. The main difference is that the ejector of FIG. 4 is adapted to operate with a much greater pressure ratio between the pressure of the gas power source and the pressure within the curved mixing compartment 126. The covering-diverging shape of the power stream passageway 122 permits such operation.

The median plate 128 of the ejector 120 is wedge shaped in order to provide three-dimensional divergence or convergence for the various interconnected passageways 122, 124, 126 and 148. Of course, the vertex for a wedged shaped median plate for the ejector 120 could be positioned differently than the vertex for the wedge shaped median plate 128 of the ejector 120. Thus, the convergence or divergence of these interconnected passageways can be changed without modifying the shape of the opening corresponding to the opening 130, by merely providing a wedge shaped median plate having a differently oriented vertex.

FIGURE 5 shows an annular shaped ejector 190 illustrating another embodiment of the teachings of this invention. The main distinction between the ejector 190 of FIG. 5 and ejector 62 of FIG. 3 is that the ejector 190 is of annular shape rather than a flat configuration. It can be realized from FIG. 4 that if a sufficient number of wedge shaped median plates are stacked so as to have a common vertex an annular shaped ejector of the general configuration shown in FIG. 5 would be produced with the common vertex forming the longitudinal axis of the annular shaped ejector.

The shape of the interconnected annular shaped passageways 192 when viewed in section as shown in FIG. 5 is similar to the shape of the opening 64 shown in FIG. 3, and the shape of the interconnected passageways 192 when viewed in section is the same no matter where the radial section is taken through the ejector 190. In general, the interconnected annular shaped passageways 192 include an annular shaped curved converging power stream passageway 194, an annular shaped curved mixing compartment 196, and annular shaped discharge passageway 200. The annular shaped power stream passageway 194 receives the fluid power stream from a fluid power source 202 through an inlet connection 204 which is connected to be in communication with the annular shaped power stream passageway 194. A secondary fluid source 206 is connected so as to effect a communication with the annular shaped secondary passageway through an inlet connection 208.

As shown, the annular shaped curved mixing compartment 196 is disposed around a longitudinal axis 210 of the annular shaped ejector 190 and has an annular shaped receiving end 212 and an annular shaped discharge end 214. The annular shaped mixing compartment 196 is curved in direction from its annular shaped receiving end 212 to its annular shaped discharge end 214 and is bounded by a surface of revolution which is generated by a curved boundary line 216 which curves from the annular shaped receiving end 212 to the annular shaped discharge end 214.

The annular shaped curved converging power stream passageway 194 has an annular shaped discharge end 218 in communication with the annular shaped receiving end 212 of the annular shaped mixing compartment 196 and an annular shaped receiving end 220 for receiving the fluid power stream. The annular shaped converging power stream passageway 194 is curved in direction from its annular shaped receiving end 220 to its annular shaped discharge end 218 and is bounded by a surface of revolution which is generated by a curved boundary line 222. In order to accelerate the fluid power stream the annular shaped curved converging power stream passageway 194 converges from its receiving end 220 to its discharge end 218. The annular shaped curved converging power stream passageway 194 is so positioned as to direct the accelerated fluid power stream to flow continuously along the annular shaped boundary surface, generated by the curved boundary line of revolution 216, following the curved boundary line of revolution 216 in all its generating positions, whereby centrifugal force is set up within the accelerated fluid power stream within the annular shaped curved mixing compartment 196, to thereby effect a pressure gradient and an energy gradient in the accelerated fluid power stream within the annular shaped curved mixing compartment 196 in direction toward the annular shaped boundary surface generated by the curved boundary line of revolution 216 with the greatest pressure and energy at the annular shaped boundary surface generated by the curved boundary line of revolution 216.

The annular shaped curved converging secondary passageway 198 effects a communication between the secondary fluid source 206 and the annular shaped receiving end 212 of the annular shaped curved mixing compartment 196. The annular shaped converging secondary passageway 198 is curved in direction from its annular shaped receiving end 224 to its discharge end 226 and is bounded by a surface of revolution which is generated by a curved boundary line 228. As shown, the annular shaped discharge passageway is positioned to be in communication with the annular shaped discharge end 214 of the annular shaped mixing compartment 196 for receiving the accelerated fluid power stream and any fluid secondary stream from the annular shaped discharge end 214 of the annular shaped mixing compartment 196.

In the ejector 190 of FIG. 5, the fluid power stream may be either gas or liquid and the operation of the ejector 190 is similar to the operation of the ejector 62 of FIG. 3 except that in the ejector 190 the fluid flow is through a system of passageways that are annular shaped. Thus, a further description of the operation of the ejector 190 is deemed unnecessary.

Referring to FIGS. 6 and 7, in which like components of FIG. 4 and FIGS. 6 and 7 have been given the same reference characters, and in which like portions of the opening 130 and thus of the interconnected passageways of FIG. 4 and like portions of the interconnected passageways of FIGS. 6 and 7 have been given the same reference characters, there is illustrated an application of this invention in which a check valve 230 is positioned in a fluid secondary inlet connection 232 so that the pressure within a discharge inclosure or receiver 234 can become as great as the pressure of the gaseous power stream delivered to an ejector 235 through the inlet connection 144 and so as to prevent the fluid gaseous power stream or primary gas stream in the curved mixing compartment or curved accelerator passage 126 from entering a low pressure gas enclosure or secondary fluid source 236. The ejector 235 which includes a median plate 237 and a pair of cover plates 238 is similar to the ejector 120, of FIG. 4, except in the ejector 235 a discharge passageway 239 is provided which is a simple divergent type having a circular cross-section at its discharge end 240. The discharge enclosure 234 is disposed to receive the discharge gaseous mixture from the discharge passageway 239 at a pressure intermediate the pressures of the fluid power stream and the fluid secondary stream.

The operation of the apparatus shown in FIGS. 6 and 7 is similar to the operation of the apparatus shown in FIG. 4 when a fluid secondary stream is flowing except that since the discharge enclosure 234 is provided, the pressure of the discharge gaseous mixture disposed therein may build up to a value at which the ejector 235 stalls, in which case the check valve 230 prevents the flow of the fluid power stream from the curved mixing compartment 126 into the low pressure gas enclosure 236. With the closing of the check valve 230 the pressure inside the discharge enclosure 234 may build up to the pressure of the fluid power stream entering the ejector 235. Thus, gas or vapor at the pressure of the fluid power stream entering the ejector 235 can be used to pump other gas or vapor efficiently from the low pressure gas enclosure 236 at a low pressure and discharge it into the discharge enclosure 234 at a rising intermediate pressure.

Referring to FIGS. 8 and 9, in which like components of FIGS. 1 and 2 and FIGS. 8 and 9 have been given the same reference characters, and in which like portions of the opening 18 and thus of the interconnected passageways of FIGS. 1 and 2 and like portions of the interconnected passageways of FIGS. 8 and 9 have been given the same reference characters, there is illustrated an application of this invention in which combustible gaseous fuel is supplied from a high pressure fuel gas source 240 through an inlet connection 241 to the curved mixing compartment or accelerator passage 12 of an ejector 242 to increase the velocity of the discharge stream of the ejector 242. The ejector 242 includes a median plate 244 and a pair of cover plates 246. The ejector 242 is similar to the ejector 10, of FIGS. 1 and 2, except in the ejector 242 a shortened discharge passageway 247 is provided and also a secondary passageway 248 which is converging and curved.

The operation of the apparatus of FIGS. 8 and 9 is similar to the operation of the apparatus of FIGS. 1 and 2 except for the added function performed by the curved converging secondary passageway 248 which performs a function similar to that performed by the curved converging secondary passageway 84 of FIG. 3, and except for added function of combustion which takes place as the gaseous fuel enters the curved mixing compartment 12 and expansion and acceleration takes place in the shortened discharge passageway 247 due to temperature rise in the curved mixing compartment 12 and the discharge passageway 247. The acceleration of the gaseous discharge stream within the shortened discharge passageway 247 results in a high discharge velocity for the gaseous discharge stream. The shortened discharge passageway 247 need only be long enough to distribute the unit pressure energy equally across the transverse section of the shortened discharge passageway 247 at the discharge end 250 of the shortened discharge passageway 247. The discharge passageways 32, 88 and 200 of the ejectors 10, 62 and 190, respectively, can likewise be shortened to obtain a high discharge velocity for the fluid discharge stream.

It is to be understood that the discharge ends of the discharge passageways 18, 88, 148 and 247 can be of circular or other desirable cross-section rather than of rectangular cross-section as shown. Likewise, the receiving ends of the power stream passageways 14, 76 and 122 and the receiving ends of the secondary passageways 30, 84, 124 and 248 can be of circular or other desirable cross-section rather than of rectangular cross-section as shown. Further, a curved convergent-divergent secondary passageway (not shown) may be substituted for the curved convergent secondary passageway 124 of the ejector 120 of FIG. 4 when there is a large pressure ratio between the pressure of the incoming fluid secondary stream and the lowest pressure within the curved mixing compartment 126. Also, the fluid handling capacity of the ejectors shown in FIGS. 1, 2, 3, 4, 6, 7, 8 and 9 can be increased by increasing the thickness of their respective median plates without changing the other characteristics of operation of the ejectors such as pressure ratios and mass flow ratios.

It is obvious from the drawings and the specification that in all of the ejectors shown that if an accelerated fluid power stream were to flow through each of the curved mixing compartments, each of the flow lines of the accelerated fluid power stream would lie within an approximate plane. A deviation from a true plane could be caused for instance by turbulence within the accelerated fluid power stream or by having other desirable cross-sections for the mixing compartment other than rectangular or annular. For instance in the curved mixing compartments of the ejectors of FIGS. 1, 2, 3, 6, 7, 8 and 9 the approximate planes including the flow lines of the accelerated fluid power stream are substantially parallel to the cover plates of the respective ejectors. On the other hand, in the curved mixing compartments of the ejectors of FIGS. 4 and 5 the approximate planes including the flow lines of the accelerated fluid power stream are inclined one to another such that they all pass through the vertex of the respective ejector. If a secondary fluid stream were also to flow through each of the ejectors of FIGS. 1 through 9 so as to form a combined or mixed fluid stream, each of the flow lines of the combined or mixed fluid stream in the respective curved mixing compartments would lie within an approximate plane which in the ejectors of FIGS. 1, 2, 3, 6, 7, 8 and 9 would be substantially parallel to the respective cover plates of the ejectors and which in the ejectors of FIGS. 4 and 5 would pass through the vertex of the respective ejector. Here again any deviation from a true plane could be caused for instance by turbulence within the combined or mixed fluid stream or by having other desirable cross-sections for the mixing compartment other than rectangular or annular.

Apparatus embodying the teachings of this invention has several advantages. For instance, such apparatus has higher efficiency than ejectors of the prior art. In addition, apparatus embodying teachings of this invention effects a greater pressure ratio between the pressure of the discharge fluid and the pressure at the secondary fluid source. Further, the ejectors of FIGS. 1, 2, 3, and 5 even though their power stream passageways are merely of a converging shape, are capable of efficient operation over a wide range of pressure ratio between the pressure of the fluid power stream entering the power stream passageway and the pressure of the fluid secondary stream where it enters the curved mixing compartment of the ejector. Also, the fluid handling capacity of the ejectors of FIGS. 1, 2, 3, 4, 6, 7, 8 and 9 can be readily changed as hereinbefore mentioned. In addition, the ejectors of FIGS. 1, 2, 3, and 5 are versatile in that they can be effectively operated with a fluid power stream that is either liquid or gas.

Since certain changes may be made in the above described apparatus and different embodiments of the invention may be made without departing from the spirit and scope thereof, it is intended that all matter contained in the above description or shown in the accompanying drawings shall be interpreted as illustrative and not a limiting sense.

I claim as my invention:

1. In an ejector adapted to receive a fluid power stream and to be in communication with a secondary fluid source, the combination comprising, means for so defining a power stream passageway having a receiving end for receiving the fluid power stream and a discharge end through which the fluid power stream is discharged that at least a portion of said power stream passageway is convergent; means defining a compartment having a receiving end and a discharge end, said compartment being bounded by at least one curved boundary surface which curves in direction from the receiving end of said compartment to the discharge end of said compartment, and said compartment being so disposed as to receive the fluid power stream from the discharge end of said power stream passageway and being so shaped as to so guide the fluid power stream continuously along said one curved boundary surface of said compartment that centrifugal force results within the fluid power stream within said compartment, with an accompanying pressure gradient and kinetic energy gradient in direction toward said one curved boundary surface with the greatest unit pressure energy and unit kinetic energy at said one curved boundary surface and with the least unit pressure energy and unit kinetic energy farthest from said one curved boundary surface so that a portion of the fluid power stream within said compartment has the greatest unit pressure energy and unit kinetic energy and another portion of the fluid power stream within said compartment has the least unit pressure energy and unit kinetic energy; means defining a secondary passageway for effecting a communication between the secondary fluid source and that portion of the fluid power stream within said compartment that has the least unit pressure energy and unit kinetic energy; and means defining a discharge passageway for receiving the fluid power stream from said discharge end of said compartment.

2. In an ejector adapted to receive a fluid power stream and to be in communication with a secondary fluid source, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defiining a compartment having a receiving end and a discharge end, said compartment being bounded by at least one curved boundary surface which curves in direction from the receiving end of said compartment to the discharge end of said compartment and forms a continuous curve with said one curved boundary surface of said power stream passageway with the curvature of said one curved boundary surface of said compartment being of the same algebraic sign as the curvature of said one curved boundary surface of said power stream passageway, and said compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said compartment that the centrifugal force due to the flow of the accelerated fluid power stream along said one curved boundary surface of said compartment in direction from the receiving end of said compartment to the discharge end of said compartment maintains within the accelerated fluid power stream within said compartment a pressure gradient and a kinetic energy gradient in direction toward said one curved boundary surface of said compartment with the greatest unit pressure energy and unit kinetic energy at said one curved boundary surface of said compartment and with the least unit pressure energy and unit kinetic energy farthest from said one curved boundary surface of said compartment; means defining a secondary passageway for effecting a communication between the secondary fluid source and the receiving end of said compartment so that the secondary fluid source is in communication with that portion of the accelerated fluid power stream within said compartment that has the least unit pressure energy and unit kinetic energy; and means defining a discharge passageway, positioned to be in communication with the discharge end of said compartment, for receiving the accelerated fluid power stream from the discharge end of said compartment.

3. In an ejector adapted to receive a fluid power stream and to be in communication with a secondary fluid source, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a compartment having a receiving end and a discharge end, said compartment being bounded by at least one curved boundary surface which curves in direction from the receiving end of said compartment to the discharge end of said compartment and forms a continuous curve with said one curved boundary surface of said power stream passageway with the curvature of said one curved boundary surface of said compartment being of the same algebraic sign as the curvature of said one curved boundary surface of said power stream passageway, and said compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said compartment that the centrifugal force resulting within the accelerated fluid power stream within said compartment due to the flow of the accelerated fluid power stream along said one curved boundary surface of said compartment in direction from the receiving end of said compartment to the discharge end of said compartment maintains within the accelerated fluid power stream within said compartment a pressure gradient and a kinetic energy gradient in the accelerated fluid power stream within said compartment in direction toward said one curved boundary surface of said compartment with the greatest unit pressure energy and unit kinetic energy at said one curved boundary surface of said compartment and with the least unit pressure energy and unit kinetic energy farthest from said one curved boundary surface of said compartment; means defining a secondary passageway for effecting a communication between the secondary fluid source and the receiving end of said compartment so that the secondary fluid source is in communication with that portion of the accelerated fluid power stream within said compartment that has the least unit pressure energy and unit kinetic energy; and means for so defining a discharge passageway, for receiving the accelerated fluid power stream from the discharge end of said compartment, that said discharge passageway has only one bounding envelope.

4. In an ejector adapted to receive a fluid power stream and to be in communication with a secondary fluid source, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a compartment having a receiving end and a discharge end, said compartment being bounded by at least one curved boundary surface which curves in direction from the receiving end of said compartment to the discharge end of said compartment and forms a continuous curve with said one curved boundary surface of said power stream passageway with the curvature of said one curved boundary surface of said compartment being of the same algebraic sign as the curvature of said one curved boundary surface of said power stream passageway, and said compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said compartment, with each of the flow lines of the accelerated fluid power stream lying within an approximate plane, that the centrifugal force due to the flow of the accelerated fluid power stream along said one curved boundary surface of said compartment in direction from the receiving end of said compartment to the discharge end of said compartment maintains within the accelerated fluid power stream within said compartment a pressure gradient and a kinetic energy gradient in direction toward said one curved boundary surface of said compartment with the greatest unit pressure energy and unit kinetic energy at said one curved boundary surface of said compartment and with the least unit pressure energy and unit kinetic energy farthest from said one curved boundary surface of said compartment; means defining a secondary passageway for effecting a communication between the secondary fluid source and the receiving end of said compartment so that the secondary fluid source is in communication with that portion of the accelerated fluid power stream within said compartment that has the least unit pressure energy and unit kinetic energy; and means for so defining a discharge pasageway having a receiving end for receiving the accelerated fluid power stream from the discharge end of said compartment that the curvature of the flow path of the fluid power stream received from the discharge end of said compartment and within said discharge passageway is reversed so that the total unit pressure energy and unit kinetic energy of the fluid power stream received from the discharge end of said compartment and within said discharge passageway approaches a uniform value at all points in direction transverse to the flow direction of such fluid power stream within said discharge passageway.

5. In an ejector adapted to receive a fluid power stream and a fluid secondary stream, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a mixing compartment having a receiving end and a discharge end, said mixing compartment being bounded by at least one curved boundary surface which curves in direction from the receiving end of said mixing compartment to the discharge end of said mixing compartment and forms a continuous curve with said one curved boundary surface of said power stream passageway with the curvature of said one curved boundary surface of said mixing compartment being of the same algebraic sign as the curvature of said one curved boundary surface of said power stream passageway, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment that the centrifugal force due to the flow of the accelerated fluid power stream along said one curved boundary surface of said mixing compartment in direction from the receiving end of said mixing compartment to the discharge end of said mixing compartment maintains within the accelerated fluid power stream within said mixing compartment a pressure gradient and a kintic energy gradient in direction toward said one curved boundary surface of said mixing compartment with the greatest unit pressure energy and unit kinetic energy at said one curved boundary surface of said mixing compartment and with the least unit pressure energy and unit kinetic energy farthest from said one curved boundary surface of said mixing compartment; means defining a secondary passageway having a discharge end in communication with the receiving end of said mixing compartment and a receiving end for receiving the fluid secondary stream, said secondary passageway being so shaped as to accelerate the fluid secondary stream within said secondary passageway and being bounded by a least one curved boundary surface which curves in direction from the receiving end of said secondary passageway to the discharge end of said secondary passageway and has a curvature which is of the same algebraic sign as the curvature of said one curved boundary surface of said power stream passageway so as to create a pressure gradient and a kinetic energy gradient in the accelerated fluid secondary stream in direction transverse to the flow direction of the accelerated fluid secondary stream throughout the major portion of the length of said secondary passageway so that the portion of the accelerated fluid secondary stream flowing along said one curved boundary surface of said secondary passageway has the greatest unit pressure energy and unit kinetic energy, and said secondary passageway being so positioned as to direct the accelerated fluid secondary stream into said mixing compartment in such a way that the portion of the accelerated fluid secondary stream of greatest unit pressure energy and unit kinetic energy flows in contact with that portion of the accelerated fluid power stream of least unit pressure energy and unit kinetic energy whereby the accelerated fluid secondary stream is further accelerated and partially mixed with the accelerated fluid power stream to form a partially mixed fluid stream; and means for so defining a discharge passageway for receiving the partially mixed fluid stream from the discharge end of said mixing compartment that said discharge passageway has only one bounding envelope, said discharge passageway being so shaped as to so change the flow path of the partially mixed fluid stream that the total unit pressure energy and unit kinetic energy of the partially mixed fluid stream approaches a uniform value at all points in direction transverse to the flow direction of the partially mixed fluid stream.

6. In an ejector adapted to receive a fluid power stream and a fluid secondary stream, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream so that the portion of the accelerated fluid power stream flowing along said one curved boundary surface has the greatest unit pressure energy and unit kinetic energy; means defining a mixing compartment having a receiving end and a discharge end, said mixing compartment being bounded by at least one curved boundary surface which curves in direction from the receiving end to the discharge end of said mixing compartment and forms a continuous curve with said one curved boundary surface of said power stream passageway with the curvature of said one curved boundary surface of said mixing compartment being of the same algebraic sign as the curvature of said one curved boundary surface of said power stream passageway, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment, with each of the flow lines of the accelerated fluid power stream lying within an approximate plane, that the centrifugal force due to the flow of the accelerated fluid power stream along said one curved boundary surface of said mixing compartment in direction from the receiving end of said mixing compartment to the discharge end of said mixing compartment maintains a pressure gradient and a kinetic energy gradient in the accelerated fluid power stream within said mixing compartment in direction toward said one curved boundary surface of said mixing compartment with the greatest unit pressure energy and unit kinetic energy at said one curved boundary surface of said mixing compartment and with the least unit pressure energy and unit kinetic energy farthest from said one curved boundary surface of said mixing compartment; means defining a secondary passageway having a receiving end for receiving the fluid secondary stream and a discharge end in communication with the receiving end of said mixing compartment so as to form a point of confluence between the discharge end of said secondary passageway and the discharge end of said power stream passageway, said secondary passageway being so shaped as to accelerate the fluid secondary stream within said secondary passageway, and said secondary passageway being bounded by at least one curved boundary surface which curves in direction from the receiving end of said secondary passageway to said point of confluence and has a curvature which is of the same algebraic sign as the curvature of said one curved boundary surface of said power stream passageway so as to create a pressure gradient and a kinetic energy gradient in the accelerated fluid secondary stream in direction transverse to the flow direction of the accelerated fluid secondary stream so that the portion of the accelerated fluid secondary stream flowing along said one curved boundary surface of said secondary passageway has the greatest unit presure energy and unit kinetic energy, and said secondary pasageway being so positioned as to direct the accelerated fluid secondary stream into said mixing compartment in such a way that the portion of the accelerated fluid secondary stream of greatest unit pressure energy and unit kinetic energy flows in contact with that portion of the accelerated fluid power stream of least unit pressure energy and unit kinetic energy to form a combined fluid stream with each of the flow lines of the combined fluid stream lying within an approximate plane; and means defining a discharge passageway for receiving the combined fluid stream from the discharge end of said mixing compartment.

7. The ejector according to claim 6 in which said discharge passageway has only one bounding envelope and said discharge passageway is so shaped as to change the flow path of the combined fluid stream that the total unit pressure energy and unit kinetic energy of the combined fluid stream within said discharge passageway approaches a uniform value at all points in direction transverse to the flow direction of the combined fluid stream.

8. In an ejector adapted to receive a fluid power stream and a fluid secondary stream, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a mixing compartment having a receiving end and a discharge end, said mixing compartment being bounded by at least one curved boundary surface which curves in direction from the receiving end of said mixing compartment to the discharge end of said mixing compartment and forms a continuous curve with said one curved boundary surface of said power stream passageway with the curvature of said one curved boundary surface of said mixing compartment being of the same algebraic sign as the curvature of said one curved boundary surface of said power stream passageway, the curvature of said one curved boundary surface becoming less as the discharge end of said mixing compartment is approached, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment, with each of the flow lines of the accelerated fluid power stream lying within an approximate plane, that the centrifugal force due to the flow of the accelerated fluid power stream along said one curved boundary surface of said mixing compartment in direction from the receiving end of said mixing compartment to the discharge end of said mixing compartment maintains within the accelerated fluid power stream within said mixing compartment a pressure gradient and a kinetic energy gradient in the accelerated fluid power stream within said mixing compartment in direction toward said one curved boundary surface of said mixing compartment with the greatest unit pressure energy and unit kinetic energy at said one curved boundary surface of said mixing compartment and with the least until pressure energy and unit kinetic energy farthest from said one curved boundary surface of said mixing compartment, and whereby as the curvature of said one curved boundary surface of said mixing compartment becomes less the centrifugal force within the accelerated fluid power stream relaxes; means defining a secondary passageway having a discharge end in communication with said mixing compartment and a receiving end for receiving the fluid secondary stream, sad secondary passageway being so positioned as to direct the fluid secondary stream into said mixing compartment in such a way that the fluid secondary stream flows into contact with that portion of the accelerated fluid power stream that has the least unit pressure energy and unit kinetic energy to form a combined fluid stream with each of the flow lines of the combined fluid stream lying within an approximate plane and in which combined fluid stream, due to the relaxation of the centrifugal force within the accelerated fluid power stream, kinetic energy is transmitted away from that portion of the accelerated fluid power stream within said mixing compartment that has the greatest unit pressure energy and unit kinetic energy toward the remaining portion of the combined fluid stream; and means for so defining a discharge passageway, for receiving the combined fluid stream from the discharge end of said mixing compartment, that said discharge passageway has only one bounding envelope, and said discharge passageway being so shaped as to so change the flow path of the combined fluid stream that the total unit pressure energy and unit kinetic energy of the combined fluid stream within said discharge passageway approaches a uniform value at all points in direction transverse to the flow direction of the combined fluid stream.

9. In an ejector adapted to receive a fluid power stream and a fluid secondary stream, the combination comprising, means defining a power stream passageway having a discharge end and a reciving end for receiving the fluid power stream, said power stream passageway being so shaped as to accelerate the fluid power stream within said power stream passageway and said power stream passageway being bounded by at least one curved boundary surface which curves in direction from the receiving end of said power stream passageway to the discharge end of said power stream passageway, and said power stream passageway being so shaped as to create a pressure gradient and a kinetic gradient in the accelerated fluid power stream within said power stream passageway in direction transverse to the flow direction of the accelerated fluid power stream so that the portion of the fluid power stream flowing along said one curved boundary surface of said power stream passageway has the greatest unit pressure energy and unit kinetic energy, and said power stream passageway being such as to direct the accelerated fluid power stream out through said discharge end; means defining a mixing compartment having a receiving end and a discharge end, said mixing compartment being bounded by at least one curved boundary surface which curves in direction from the receiving end of said mixing compartment to the discharge end of said mixing compartment and forms a continuous curve with said one curved boundary surface of said power stream passageway with the curvature of said one curved boundary surface of said mixing compartment being of the same algebraic sign as the curvature of said one curved boundary surface of said power stream passageway, the curvature of said one curved boundary surface of said mixing compartment becoming less as the discharge end of said mixing compartment is approached, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment, with each of the flow lines of the accelerated fluid power stream lying within an approximate plane, that the centrifugal force due to the flow of the accelerated fluid power stream along said one curved boundary surface of said mixing compartment in direction from the receiving end of said mixing compartment to the discharge end of said mixing compartment maintains within the accelerated fluid power stream within said mixing compartment a pressure gradient and a kinetic energy gradient in the accelerated fluid power stream within said mixing compartment in direction toward said one curved boundary surface of said mixing compartment with the greatest unit pressure energy and unit kinetic energy at said one curved boundary surface of said mixing compartment and with the least unit pressure energy and unit kinetic energy farthest from said one curved boundary surface of said mixing compartment, and whereby as the curvature of said one curved boundary surface of said mixing compartment becomes less the centrifugal force within the accelerated fluid power stream relaxes; means defining a secondary passageway having a receiving end for receiving the fluid secondary stream and a discharge end in communication with the receiving end of said mixing compartment so as to form a point of confluence between the discharge end of said secondary passageway and the discharge end of said power stream passageway, said secondary passageway being so shaped as to accelerate the fluid secondary stream within said secondary passageway, and said secondary passageway being bounded by at least one curved boundary surface which curves in direction from the receiving end of said secondary passageway to said point of confluence and has a curvature which is of the same algebraic sign as the curvature of said one curved boundary surface of said power stream passageway so as to create a pressure gradient and a kinetic energy gradient in the fluid secondary stream in direction transverse to the flow direction of the fluid secondary stream so that the portion of the fluid secondary stream flowing along said one curved boundary surface of said secondary passageway has the greatest unit pressure energy and unit kinetic energy, and said secondary passageway being so positioned as to direct the fluid secondary stream into said mixing compartment in such a way that the portion of the fluid secondary stream of greatest unit pressure energy and unit kinetic energy flows into contact with that portion of the accelerated fluid power stream within said mixing compartment that has the least unit pressure energy and unit kinetic energy to form a combined fluid stream with each of the flow lines of the combined fluid stream lying within an approximate plane and in which combined fluid stream, due to the relaxation of the centrifugal force within the accelerated fluid power stream, kinetic energy is transmitted away from that portion of the accelerated fluid power stream within said mixing compartment that has the greatest unit pressure energy and unit kinetic energy toward the remaining portion of the combined fluid stream; and means for so defining a discharge passageway, having a receiving end for re-receiving the combined fluid stream from the discharge end of said mixing compartment, that said discharge passageway has only one bounding envelope, and said discharge passageway being so shaped as to so change the flow path of the combined fluid stream that the total unit pressure energy and unit kinetic energy of the combined fluid stream within said discharge passageway approaches a uniform value at all points in direction transverse to the flow direction of the combined fluid stream.

10. In an ejector adapted to receive a fluid power stream and a fluid secondary stream, the combination comprising, median plate means having an opening therein of predetermined shape extending from one face of said median plate means to the opposite face said of median plate means; and a pair of cover plates, one cover plate of said pair of cover plates being disposed against said one face of said median plate means and the other cover plate of said pair of cover plates being disposed against said opposite face of said median plate means so that the combination of said median plate means and said pair of cover plates define a power stream passageway having a discharge end and a receiving end for receiving the fluid power stream, said power stream passageway converging from the receiving end of said power stream passageway to the discharge end of said power stream passageway so as to accelerate the fluid power stream within said power stream passageway and said power stream passageway being bounded by at least one curved boundary surface which curves in direction from the receiving end of said power stream passageway to the discharge end of said power stream passageway, and said power stream passageway being so shaped so as to create a pressure gradient and a kinetic energy gradient in the accelerated fluid power stream within said power stream passageway in direction transverse to the flow direction of the accelerated fluid power stream so that the portion of the fluid power stream flowing along said one curved boundary surface of said power stream passageway has the greatest unit pressure energy and unit kinetic energy, and said power stream passageway being such as to direct the accelerated fluid power stream out through said discharge end, a mixing compartment having a receiving end and a discharge end, said mixing compartment being bounded by at least one curved boundary surface which curves in direction from the receiving end of said mixing compartment to the discharge end of said mixing compartment and forms a continuous curve with said one curved boundary surface of said power stream passageway with the curvature of said one curved boundary surface of said mixing compartment being of the same alebraic sign as the curvature of said one curved boundary surface of said power stream passageway, the curvature of said one curved boundary surface of said mixing compartment becoming less as the discharge end of said mixing compartment is approached, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment that the centrifugal force due to the flow of the accelerated fluid power stream along said one curved boundary surface of said mixing compartment in direction from the receiving end of said mixing compartment to the discharge end of said mixing compartment maintains within the accelerated fluid power stream within said mixing compartment a pressure gradient and a kinetic energy gradient in the accelerated fluid power stream within said mixing compartment in direction toward said one curved boundary surface of said mixing compartment with the greatest unit pressure energy and unit kinetic energy at said one curved boundary surface of said mixing compartment and with the least unit pressure energy and unit kinetic energy farthest from said one curved boundary surface of said mixing compartment, and whereby as the curvature of said one curved boundary surface of said mixing compartment becomes less the centrifugal force within the accelerated fluid power stream relaxes, a secondary passageway having a receiving end for receiving the fluid secondary stream and a discharge end in communication with the receiving end of said mixing compartment so as to form a point of confluence between the discharge end of said secondary passageway and the discharge end of said power stream passageway, and said secondary passageway being bounded by at least one curved boundary surface which curves in direction from the receiving end of said secondary passageway to said point of confluence and has a curvature which is of the same algebraic sign as the curvature of said one curved boundary surface of said power stream passageway so as to create a pressure gradient and a kinetic energy gradient in the fluid secondary stream in direction transverse to the flow direction of the fluid secondary stream so that the portion of the fluid secondary stream flowing along said one curved boundary surface of said secondary passageway has the greatest unit pressure energy and unit kinetic energy, and said secondary passageway being so positioned as to direct the fluid secondary stream into said mixing compartment in such a way that the portion of the fluid secondary stream of greatest unit pressure energy and unit kinetic energy flows into contact with that portion of the accelerated fluid power stream within said mixing compartment that has the least unit pressure energy and unit kinetic energy to form a combined fluid stream in which due to the relaxation of the centrifugal force within the accelerated fluid power stream kinetic energy is transmitted away from that portion of the accelerated fluid power stream within said mixing compartment that has the greatest unit pressure energy and unit kinetic energy toward the remaining portion of the combined fluid stream, and a discharge passageway having a discharge end, a receiving end for receiving the combined fluid stream from said discharge end of said mixing compartment, and a curved longitudinal axis in which the curvature of the curved longitudinal axis adjacent the discharge end of said mixing compartment has the same algebraic sign as the curvature of said one curved boundary surface of said mixing compartment and in which the curvature of the curved longitudinal axis goes through zero and is of the opposite algebraic sign farther away from the discharge end of said mixing compartment so that the flow path of the combined fluid stream within said discharge passageway is changed so that the total unit pressure energy and unit kinetic energy of the combined fluid stream within said discharge passageway approaches a uniform value at all points in direction transverse to the flow direction of the combined fluid stream, said discharge passageway being so shaped as to diverge over the major portion of the length of said discharge passageway in direction toward the discharge end of said discharge passageway in planes substantially parallel to the plane of the curved longitudinal axis.

11. In an annular shaped ejector having a longitudinal axis and adapted to receive a fluid power stream and a fluid secondary stream, the combination comprising, means defining an annular shaped power stream passageway disposed around the longitudinal axis of the annular shaped ejector and having an annular shaped discharge end and an annular shaped receiving end for receiving the fluid power stream, said annular shaped power stream passageway being so shaped as to accelerate the fluid power stream within said annular shaped power stream passageway whence the accelerated fluid power stream is discharged out through said annular shaped discharge end, and said annular shaped power stream passageway being bounded by a surface of revolution generated by a curved boundary line which curves in direction from the annular shaped receiving end of said annular shaped power stream passageway to the annular shaped discharge end of said annular shaped power stream passageway so as to create a pressure gradient and a kinetic energy gradient in the accelerated fluid power stream in direction transverse to the flow direction of the accelerated fluid power stream throughout the major portion of the length of said annular shaped power stream passageway so that the portion of the accelerated fluid power stream flowing along said surface of revolution has the greatest unit pressure energy and unit kinetic energy; means defining an annular shaped mixing compartment disposed around the longitudinal axis of the annular shaped ejector and having an annular shaped receiving end and annular shaped discharge end, said annular shaped mixing compartment being bounded by a surface of revolution generated by a curved boundary line which extends from the annular shaped receiving end of said annular shaped mixing compartment to the annular shaped discharge end of said annular shaped mixing compartment, said surface of revolution of said annular shaped mixing compartment forming a continuous curve with said surface of revolution of said annular shaped power stream passageway with the curvature of the curved boundary line of said annular shaped mixing compartment being of the same algebraic sign as the curvature of the curved boundary line of said annular shaped power stream passageway, the curvature of the curved boundary line of said annular shaped mixing compartment becoming less as the annular shaped discharge end of said annular shaped mixing compartment is approached, said annular shaped mixing compartment being so disposed as to receive the accelerated fluid power stream from the annular shaped discharge end of said annular shaped power stream passageway and being so shaped as to so guide that portion of the accelerated fluid power stream that has the greatest unit pressure energy and unit kinetic energy continuously along said surface of revolution of said annular shaped mixing comparment following the curved boundary line of said annular shaped mixing compartment in all its generating positions, with each of the flow lines of the accelerated fluid power stream lying within an approximate plane which includes the longitudinal axis of the annular shaped ejector, that the centrifugal force resulting within the accelerated fluid power stream within said annular shaped mixing compartment due to the flow of the accelerated fluid power stream along said surface of revolution of said annular shaped mixing compartment in direction from the annular shaped receiving end of said annular shaped mixing compartment to the annular shaped discharge end of said annular shaped mixing compartment maintains within the accelerated fluid power stream within said annular shaped mixing compartment a pressure gradient and a kinetic energy gradient in the accelerated fluid power stream within said annular shaped mixing compartment in direction toward said surface of revolution of said annular shaped mixing compartment with the greatest unit pressure energy and unit kinetic energy at said surface of revolution of said annular shaped mixing compartment and with the least unit pressure energy and unit kinetic energy farthest from said surface of revolution of said annular shaped mixing compartment, and whereby as the curvature of the curved boundary line of said annular shaped mixing compartment becomes less the centrifugal force within the accelerated fluid power stream relaxes; means defining an annular shaped secondary passageway disposed around the longitudinal axis of the annular shaped ejector and having an annular shaped discharge end in communication with said annular shaped mixing compartment and an annular shaped receiving end for receiving the fluid secondary stream, said annular shaped secondary passageway being so positioned as to direct the fluid secondary stream into said annular shaped mixing compartment in such a way that the fluid secondary stream flows into contact with that portion of the accelerated fluid power stream that has the least unit pressure energy and unit kinetic energy to form a combined fluid stream with each of the flow lines of the combined fluid stream lying within an approximate plane which includes the longitudinal axis of the annular shaped ejector and in which due to the relaxation of the centrifugal force within the accelerated fluid power stream kinetic energy is transmitted away from that portion of the accelerated fluid power stream within said annular shaped mixing compartment that has the greatest total unit pressure energy and unit kinetic energy toward the remaining portion of the combined fluid stream; and means defining an annular shaped discharge passageway, disposed around the longitudinal axis of the annular shaped ejector, for receiving the combined fluid stream from the annular shaped discharge end of said annular shaped mixing compartment, said annular shaped discharge passageway being so shaped as to so change the flow path of the combined fluid stream that the total unit pressure energy and unit kinetic energy of the combined fluid stream within said annular shaped discharge passageway approaches a uniform value at all points in direction transverse to the flow direction of the combined fluid stream.

12. In an ejector adapted to receive a fluid power stream and be in communication with a secondary fluid source, the combination comprising, means defining a power stream passageway having a discharge end and a receiving end for receiving the fluid power stream, said power stream passageway having a restricted portion so as to effect a converging-diverging shape to said power stream passageway so as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a compartment having a receiving end and a discharge end, said compartment being bounded by at least one curved boundary surface which curves in direction from the receiving end of said compartment to the discharge end of said compartment and forms a continuous curve with said one curved boundary surface of said power stream passageway with the curvature of said one curved boundary surface of said compartment being of the same algebraic sign as the curvature of said one curved boundary surface of said power stream passageway, the curvature of said one curved boundary surface of said compartment becoming less as the discharge end of said compartment is approached, and said compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said compartment, with each of the flow lines of the accelerated fluid power stream lying within an approximate plane, that the centrifugal force due to the flow of the accelerated fluid power stream along said one curved boundary surface of said compartment in direction from the receiving end of said compartment to the discharge end of said compartment maintains within the accelerated fluid power stream within said compartment a pressure gradient and a kinetic energy gradient in the accelerated fluid power stream within said compartment in direction toward said one curved boundary surface of said compartment with the greatest unit pressure energy and unit kinetic energy at said one curved boundary surface of said compartment and with the least unit pressure energy and unit kinetic energy farthest from said one curved boundary surface of said compartment, and whereby as the curvature of said one curved boundary surface of said compartment becomes less the centrifugal force within the accelerated fluid power stream relaxes and kinetic energy is transmitted from that portion of the accelerated fluid power stream flowing closest to said one curved boundary surface of said compartment to that portion of the accelerated fluid power stream within said compartment and farthest away from said one curved boundary surface of said compartment; means defining a secondary passageway for effecting a communication between the secondary fluid source and the receiving end of said compartment so that the secondary fluid source is in communication with that portion of the accelerated fluid power stream within said compartment that has the least unit pressure energy and unit kinetic energy; and means defining a discharge passageway, positioned to be in communication with the discharge end of said compartment, for receiving the accelerated fluid power stream from the discharge end of said compartment.

13. In an ejector adapted to receive a fluid power stream and to be in communication with a secondary fluid source, the combination comprising, wedge-shaped median plate means having an opening therein of predetermined shape extending from one face of said wedge-shaped median plate means to the opposite face of said wedge-shaped median plate means; and a pair of cover plates, one cover plate of said pair of cover plates being disposed against said one face of said wedge-shaped median plate means and the other cover plate of said pair of cover plates being disposed against said opposite face of said wedge-shaped median plate means so that the combination of said wedge-shaped median plate means and said pair of cover plates define a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy, a compartment having a receiving end and a discharge end, said compartment being bounded by at least one curved boundary surface which curves in direction from the receiving end of said compartment to the discharge end of said compartment and forms a continuous curve with said one curved boundary surface of said power stream passageway with the curvature of said one curved boundary surface of said compartment being of the same algebraic sign as the curvature of said one curved boundary surface of said power stream passageway, and said compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said compartment that centrifugal force due to the flow of the accelerated fluid power stream along said one curved boundary surface of said compartment in direction from the receiving end of said compartment to the discharge end of said compartment maintains within the accelerated fluid power stream within said compartment a pressure gradient and a kinetic energy gradient in direction toward said one curved boundary surface of said compartment with the greatest unit pressure energy and unit kinetic energy at said one curved boundary surface of said compartment and with the least unit pressure energy and unit kinetic energy farthest from said one curved boundary surface of said compartment; a secondary passageway for effecting a communication between the secondary fluid source and the receiving end of said compartment so that the secondary fluid source is in communication with that portion of the accelerated fluid power stream within said compartment that has the least unit pressure energy and unit kinetic energy; and a discharge passageway positioned to be in communication with the discharge end of said compartment, for receiving the accelerated fluid power stream from the discharge end of said compartment.

14. In an ejector adapted to receive a fluid power stream and to be in communication with a secondary fluid source, the combination comprising, means for so defining a power stream passageway having a receiving end for receiving the fluid power stream and a discharge end through which the fluid power stream is discharged that at least a portion of said power stream passageway is convergent; means defining a compartment having a receiving end and a discharge end, said compartment being bounded by at least one curved boundary surface which curves in direction from the receiving end of said compartment to the discharge end of said compartment, and said compartment being so disposed as to receive the fluid power stream from the discharge end of said power stream passageway and being so shaped as to so guide the fluid power stream continuously along said one curved boundary surface of said compartment that centrifugal force results within the fluid power stream within said compartment, with an accompanying pressure gradient and kinetic energy gradient in direction toward said one curved boundary surface with the greatest unit pressure energy and unit kinetic energy at said one curved boundary surface and with the least unit pressure energy and unit kinetic energy farthest from said one curved boundary surface so that a portion of the fluid power stream within said compartment has the greatest unit pressure energy and unit kinetic energy and another portion of the fluid power stream within said compartment has the least unit pressure energy and unit kinetic energy; means defining a secondary passageway for effecting a communication between the secondary fluid source and said compartment so that the secondary fluid source is in communication with that portion of the fluid power stream within said compartment that has the least unit pressure energy and unit kinetic energy; and means for so defining a discharge passageway having a receiving end for receiving the fluid power stream from the discharge end of said compartment that the curvature of the flow path of the fluid power stream received from the discharge end of said compartment and within said discharge passageway is reversed so that the total unit pressure energy and unit kinetic energy of the fluid power stream received from the discharge end of said compartment and within said discharge passageway approaches a uniform value at all points in direction transverse to the flow direction of such fluid power stream within said discharge passageway.

15. In an ejector adapted to receive a fluid power stream and a fluid secondary stream, the combination comprising, means for so defining a power stream passageway having a receiving end for receiving the fluid power stream and a discharge end through which the fluid power stream is discharged that at least a portion of said power stream passageway is convergent; means defining a mixing compartment having a receiving end and a discharge end, said mixing compartment being bounded by at least one curved boundary surface which curves in direction from the receiving end of said mixing compartment to the discharge end of said mixing compartment, and said mixing compartment being so disposed as to receive the fluid power stream from the discharge end of said power stream passageway and being so shaped as to so guide the fluid power stream continuously along said one curved boundary surface of said mixing compartment that centrifugal force results within the fluid power stream within said mixing compartment, with an accompanying pressure gradient and kinetic energy gradient in direction toward said one curved boundary surface with the greatest unit pressure energy and unit kinetic energy at said one curved boundary surface and with the least unit pressure energy and unit kinetic energy farthest from said one curved boundary surface so that a portion of the fluid power stream within said mixing compartment has the greatest unit pressure energy and unit kinetic energy and another portion of the fluid power stream within said mixing compartment has the least unit pressure energy and unit kinetic energy; means defining a secondary passageway having a discharge end in communication with said mixing compartment and a receiving end for receiving the fluid secondary stream, said secondary passageway being bounded by at least one curved boundary surface which curves in direction from the receiving end of said secondary passageway to the discharge end of said secondary passageway and has a curvature which is of the same algebraic sign as the curvature of said one curved boundary surface of said mixing compartment so as to create a pressure gradient and a kinetic energy gradient in the fluid secondary stream in direction transverse to the flow direction of the fluid secondary stream so that the portion of the fluid secondary stream flowing along said one curved boundary surface of said secondary passageway has the greatest unit pressure energy and unit kinetic energy, and said secondary passageway being so positioned as to direct the fluid secondary stream into said mixing compartment in such a way that the portion of the fluid secondary stream of greatest unit pressure energy and unit kinetic energy flows in contact with that portion of the fluid power stream of least unit pressure energy and unit kinetic energy whereby the fluid secondary stream is partially mixed with the fluid power stream to form a partially mixed fluid stream; and means for defining a discharge passageway for receiving the partially mixed fluid stream from the discharge end of said mixing compartment.

16. In an ejector adapted to receive a fluid power stream and a fluid secondary stream, the combination comprising, means for so defining a power stream passageway having a receiving end for receiving the fluid power stream and a discharge end through which the fluid power stream is discharged that at least a portion of said power stream passageway is convergent; means defining a mixing compartment having a receiving end and a discharge end, said mixing compartment being bounded by at least one curved boundary surface which curves in direction from the receiving end of said mixing compartment to the discharge end of said mixing compartment, the curvature of said one curved boundary surface becoming less as the discharge end of said mixing compartment is approached, and said mixing compartment being so disposed as to receive the fluid power stream from the discharge end of said power stream passageway and being so shaped as to so guide the fluid power stream continuously along said one curved boundary surface of said mixing compartment that centrifugal force results within the fluid power stream within said mixing compartment, with an accompanying pressure gradient and kinetic energy gradient in direction toward said one curved boundary surface with the greatest unit pressure energy and unit kinetic energy at said one curved boundary surface and with the least unit pressure energy and unit kinetic energy farthest from said one curved boundary surface, so that a portion of the fluid power stream within said mixing compartment has the greatest unit pressure energy and unit kinetic energy and another portion of the fluid power stream within said mixing compartment has the least unit pressure energy and unit kinetic energy, and whereby as the curvature of said one curved boundary surface becomes less the centrifugal force within the fluid power stream relaxes; means defining a secondary passageway having a discharge end in communication with said mixing compartment and a receiving end for receiving the fluid secondary stream, said secondary passageway being so positioned as to direct the fluid secondary stream into said mixing compartment in such a way that the fluid secondary stream flows into contact with that portion of the fluid power stream that has the least unit pressure energy and unit kinetic energy to form a combined fluid stream in which, due to the relaxation of the centrifugal force within the fluid power stream, kinetic energy is transmitted away from that portion of the fluid power stream within said mixing compartment that has the greatest unit pressure energy and unit kinetic energy toward the remaining portion of the combined fluid stream; and means defining a discharge passageway for receiving the combined fluid stream from the discharge end of said mixing compartment.

17. In an ejector adapted to receive a fluid power stream and a fluid secondary stream, the combination comprising, means defining a power stream passageway having a discharge end and a receiving end for receiving the fluid power stream, said power stream passageway being so shaped as to accelerate the fluid power stream within said power stream passageway whence the accelerated fluid power stream is discharged out through said discharge end, and said power stream passageway being bounded by at least one curved boundary surface which curves in direction from the receiving end of said power stream passageway to the discharge end of said power stream passageway so as to create a pressure gradient and a kinetic energy gradient in the accelerated fluid power stream in direction transverse to the flow direction of the accelerated fluid power stream throughout the major portion of the length of said power stream passageway so that the portion of the accelerated fluid power stream flowing along said one curved boundary surface has the greatest unit pressure energy and unit kinetic energy; means defining a mixing compartment having a receiving end and a discharge end, said mixing compartment being bounded by at least one curved boundary surface which curves in direction from the receiving end of said mixing compartment to the discharge end of said mixing compartment and forms a continuous curve with said one curved boundary surface of said power stream passageway with the curvature of said one curved boundary surface of said mixing compartment being of the same algebraic sign as the curvature of said one curved boundary surface of said power stream passageway, the curvature of said one curved boundary surface becoming less as the discharge end of said mixing compartment is approached, and said mixing compartment being so disposed as to receive the accelerated fluid power stream from the discharge end of said power stream passageway and being so shaped as to so guide that portion of the accelerated fluid power stream that has the greatest unit pressure energy and unit kinetic energy continuously along said one curved boundary surface of said mixing compartment, with each of the flow lines of the accelerated fluid power stream lying within an approximate plane, that the centrifugal force due to the flow of the accelerated fluid power stream along said one curved boundary surface of said mixing compartment in direction from the receiving end of said mixing compartment to the discharge end of said mixing compartment maintains within the accelerated fluid power stream within said mixing compartment a pressure gradient and a kinetic energy gradient in the accelerated fluid power stream within said mixing compartment in direction toward said one curved boundary surface of said mixing compartment with the greatest unit pressure energy and unit kinetic energy at said one curved boundary surface of said mixing compartment and with the least unit pressure energy and unit kinetic energy farthest from said one curved boundary surface of said mixing compartment, and whereby as the curvature of said one curved boundary surface of said mixing compartment becomes less the centrifugal force within the accelerated fluid power stream relaxes; means defining a secondary passageway having a discharge end in communication with said mixing compartment and a receiving end for receiving the fluid secondary stream, said secondary passageway being so positioned as to direct the fluid secondary stream into said mixing compartment in such a way that the fluid secondary stream flows into contact with that portion of the accelerated fluid power stream that has the least unit pressure energy and unit kinetic energy to form a combined fluid stream with each of the flow lines of the combined fluid stream lying within an approximate plane and in which combined fluid stream, due to the relaxation of the centrifugal force within the accelerated fluid power stream, kinetic energy is transmitted away from that portion of the accelerated fluid power stream within said mixing compartment that has the greatest unit pressure energy and unit kinetic energy toward the remaining portion of the combined fluid stream; and means defining a discharge passageway for receiving the combined fluid stream from the discharge end of said mixing compartment.

References Cited by the Examiner
UNITED STATES PATENTS
1,512,156 10/24 Baumann —————— 230—110 X
3,022,743 2/62 Engholdt —————— 103—262 X

FOREIGN PATENTS
785,448 5/35 France.

LAURENCE V. EFNER, *Primary Examiner.*
ROBERT M. WALKER, *Examiner.*